(12) United States Patent
Weiss et al.

(10) Patent No.: US 9,352,543 B2
(45) Date of Patent: May 31, 2016

(54) DIRECT IMPRINTING OF POROUS SUBSTRATES

(75) Inventors: Sharon M. Weiss, Franklin, TN (US);
Judson D. Ryckman, Nashville, TN (US); Marco Liscidini, Pavia (IT); John E. Sipe, Toronto (CA)

(73) Assignee: Vanderbilt University, Nashville, TN (US)

( * ) Notice: Subject to any disclaimer, the term of this patent is extended or adjusted under 35 U.S.C. 154(b) by 594 days.

(21) Appl. No.: 12/790,908

(22) Filed: May 31, 2010

(65) Prior Publication Data
US 2011/0056398 A1 Mar. 10, 2011

Related U.S. Application Data

(60) Provisional application No. 61/182,451, filed on May 29, 2009.

(51) Int. Cl.
*B41D 7/00* (2006.01)
*B29D 11/00* (2006.01)

(52) U.S. Cl.
CPC . *B41D 7/00* (2013.01); *B29D 11/00* (2013.01); *Y10T 436/143333* (2015.01)

(58) Field of Classification Search
CPC ............... B29D 11/00769; B41D 7/00; Y10T 436/14333
USPC ........... 264/1.1, 319, 320, 322; 430/322, 323, 430/324
See application file for complete search history.

(56) References Cited

U.S. PATENT DOCUMENTS

| | | | |
|---|---|---|---|
| 5,017,007 | A | 5/1991 | Milne et al. |
| 5,468,606 | A | 11/1995 | Bogart et al. |
| 6,248,539 | B1 | 6/2001 | Ghadiri et al. |
| 7,027,163 | B2 | 4/2006 | Angeley |
| 7,195,733 | B2 | 3/2007 | Rogers et al. |
| 7,226,733 | B2 | 6/2007 | Chan et al. |
| 7,271,896 | B2 | 9/2007 | Chan et al. |
| 7,410,763 | B2 | 8/2008 | Su et al. |
| 7,450,227 | B2 | 11/2008 | Dwight et al. |

(Continued)

FOREIGN PATENT DOCUMENTS

WO 2009062757 5/2009

OTHER PUBLICATIONS

Alexander, T.A. et al., "Characterization of a commercialized SERS-active substrate and its application to the identification of intact Bacillus endospores," Appl. Optics (2007) 46(18):3878-3890.

(Continued)

*Primary Examiner* — Mathieu Vargot
(74) *Attorney, Agent, or Firm* — Michael Best & Friedrich LLP

(57) ABSTRACT

Provided are methods of patterning porous materials on the micro- and nanometer scale using a direct imprinting technique. The present methods of direct imprinting of porous substrates ("DIPS"), can utilize reusable stamps that may be directly applied to an underlying porous material to selectively, mechanically deform and/or crush particular regions of the porous material, creating a desired structure. The process can be performed in a matter of seconds, at room temperature or higher temperatures, and eliminates the requirement for intermediate masking materials and etching chemistries.

29 Claims, 16 Drawing Sheets

(56) References Cited

U.S. PATENT DOCUMENTS

| | | | |
|---|---|---|---|
| 7,517,656 B2 | 4/2009 | Martin et al. | |
| 7,582,486 B2 | 9/2009 | Gollier et al. | |
| 7,618,250 B2 | 11/2009 | Van Santan et al. | |
| 7,692,771 B2 | 4/2010 | Kolesnychenko et al. | |
| 7,843,562 B2 | 11/2010 | Chan et al. | |
| 2005/0186515 A1* | 8/2005 | Watkins | 430/322 |
| 2005/0246021 A1* | 11/2005 | Ringeisen et al. | 623/17.11 |
| 2006/0063178 A1 | 3/2006 | Rauh-Adelmann et al. | |
| 2006/0152147 A1 | 7/2006 | Lee et al. | |
| 2007/0115469 A1 | 5/2007 | Ebstein | |
| 2008/0157235 A1 | 7/2008 | Rogers et al. | |
| 2008/0208351 A1* | 8/2008 | Besenbacher et al. | 623/23.5 |
| 2009/0093879 A1 | 4/2009 | Wawro et al. | |
| 2009/0140458 A1 | 6/2009 | Xu et al. | |
| 2009/0269587 A1 | 10/2009 | Dressick et al. | |
| 2009/0273119 A1 | 11/2009 | Imai | |
| 2009/0279085 A1 | 11/2009 | Ebstein | |
| 2010/0084376 A1 | 4/2010 | Khusnatdinov et al. | |
| 2010/0106233 A1* | 4/2010 | Grant et al. | 623/1.1 |
| 2011/0059538 A1 | 3/2011 | Weiss | |
| 2013/0182249 A1 | 7/2013 | Weiss et al. | |
| 2014/0043607 A1 | 2/2014 | Wang et al. | |
| 2014/0255653 A1 | 9/2014 | Weiss et al. | |

OTHER PUBLICATIONS

Chu, Y. et al., "Double-resonance plasmon substrates for surface-enhanced raman scattering with enhancement at excitation and stokes frequencies," ACS Nano (2010) 4:2804-2810.

Ciesielski, P.N. et al., "Functionalized nanoporous gold leaf electrode films for the immobilization of photosystem I," ACS Nano (2008) 2:2465-2472.

Ding, Y. et al., "Nanoporous gold leaf: 'ancient technology'/advanced material," Adv. Mater. (2004) 16(21):1897-1900.

Jane, A. et al., "Porous silicon biosensors on the advance," Trends in Biotechnology (2009) 27(4):230-239.

Kasuga, T. et al., "Formation of titanium oxide nanotube," Langmuir (1998) 14:3160-3163.

Kneipp, K. et al., "Single molecule detection using surface-enhanced Raman scattering (SERS)" Phys. Rev. Lett. (1997) 78(9):1667-1670.

Kucheyev, S.O. et al., "Surface-enhanced Raman scattering on nanoporous Au," Appl. Phys. Lett. (2006) 89:053102-1-053102-3.

Lang, X.Y. et al., "Geometric effect on surface enhanced Raman scattering of nanoporoud gold: improving Raman scattering by tailoring ligament and nanopore ratios," Appl. Phys. Lett. (2009) 94:213109-1-213109-3.

Li, A.P. et al., "Hexagonal pore arrays with a 50-420nm interpore distance formed by self-organization in anodic alumina," J. Appl. Phys. (1998) 84(11):6023-6026.

Liscidini, M. et al., "Gratings on porous silicon structures for sensing applications," in Conference on Lasers and Electro-Optics/International Quantum Electronics Conference, OSA Technical Digest (Optical Society of America, 2009), paper CMG7, 2 pages.

Liscidini, M. et al., "Scattering-matrix analysis of periodically patterned multilayers with asymmetric unit cells and birefringement media," Physical Review B (2008) 77:035324, 11 pages.

Liscidini, M. et al., Conference abstract submitted to Conference on Lasers and Electro-Optics on Dec. 4, 2008, 2 pages.

Liscidini, M. et al., Conference presentation at Conference on Lasers and Electro-Optics on Jun. 1, 2009, 2 pages.

Moskovits, M. "Surface-enhanced spectroscopy," Rev. Mod. Phys. (1985) 57:783-826.

Qian, L.H. et al., "Surface enhanced Raman scattering of nanoporous gold: smaller pore sizes stronger enhancements," Appl. Phys. Lett. (2007) 90:153120-1-153120-3.

Ryckman, J.D. et al., "Low-cost optical microstructures fabricated by imprinting porous silicon," Advanced Fabrication Technologies for Micro-Nano Optics and Photonics III, edited by Winston V. Schoenfeld, Proc. of SPIE 7591 (2010) 759108-1 to 9.

Ryckman, J.D. et al., "Porous silicon structures for low-cost diffraction-based biosensing," Appl. Phys. Lett. (2010) 96:171103, 3 pages.

Ryckman, J.D. et al., "Micron and submicron sized optical structures fabricated by imprinting porous silicon," Porous Semiconductors—Science and Technology Conference, Valencia, Spain, Mar. 2010, 2 pages.

Sipe, J.E. et al., "Enhancement of diffraction-based biosensing using porous structures and electromagnetic surface states," Proc. of SPIE 7553, 7553OM (Feb. 2010) 7 pages.

Smith, R.L. et al., "Porous silicon formation mechanisms," J. Appl. Phys. (1992) 71:R1-R22.

Wokaun, "Surface enhanced electromagnetic processes," Solid State Phys. (1984) 38:223-294.

Zeon Corporation, Zeonrex Electornic Chemicals, ZEP520A Technical Report, "High Resolution Positive Electron Beam Resist," Version 1.01 (Apr. 2003) 12 pages.

Hrudey, P.C.P. et al., "Variable diffraction gratings using nanoporous electrodes and electrophoresis of dye ions," Nanoengineering: Fabrication, Properties, Optics and Devices IV, edited by E.A. Dobisz et al., Proc. of SPIE (2007) 6645:66450K1-12.

United States Patent Office Action for U.S. Appl. No. 12/790,905 dated Apr. 3, 2012 (9 pages).

United States Patent Office Notice of Allowance for U.S. Appl. No. 12/790,905 dated Sep. 17, 2012 (8 pages).

PCT/US2011/001627 International Search Report dated Dec. 30, 2011 (3 pages).

United States Patent Office Action for U.S. Appl. No. 13/825,125 dated Mar. 26, 2015 (24 pages).

Bok, H. M. et al., "Multiple surface plasmon modes for a colloidal solution of nanoporous gold nanorods and their comparison to smooth gold nanorods," Nano Lett. 8, 2265-2270 (2008).

Bosman, M. et al., "Light Splitting in Nanoporous Gold and Silver," ACS Nano 6, 319-326 (2012).

Cunin, F. et al., "Biomolecular screening with encoded porous-silicon photonic crystals," Nat. Mater. 1, 39-41 (2002).

Del Campo, A. et al., "Fabrication approaches for generating complex micro- and nanopatterns on polymeric surfaces," Chem Rev 108, 911-945 (2008).

Freese, W. et al., "Design of binary subwavelength multiphase level computer generated holograms," Opt. Lett. 35, 676-678 (2010).

Fu, Y. Q. et al., "Diffractive optical elements with continuous relief fabricated by focused ion beam for monomode fiber coupling," Opt. Express 7, 141-147 (2000).

Gates, B. D. et al., "New approaches to nanofabrication: Molding, printing, and other techniques," Chem Rev 105, 1171-1196 (2005).

Geissler, M. et al., "Patterning: Principles and Some New Developments," Adv Mater 16, 1249-1269 (2004).

Gharghi, M. et al., "A Carpet Cloak for Visible Light," Nano Lett. 11, 2825-2828 (2011).

Guo, C. et al., "Grayscale photomask fabricated by laser direct writing in metallic nano-films," Opt. Express 17, 19981-19987 (2009).

Guo, L. J., "Nanoimprint Lithography: Methods and Material Requirements," Adv Mater 19, 495-513 (2007).

Hsu, K. H. et al., Electrochemical nanoimprinting with solid-state superionic stamps. Nano Lett. 7, 446-451 (2007).

Jiao, Y. et al., "Patterned nanoporous gold as an effective SERS template. Nanotechnology 22," 5302 (2011).

Lang, X. Y. et al., "Localized surface plasmon resonance of nanoporous gold," Appl. Phys. Lett. 98, 093701 (2011).

Larouche, S. et al., "Infrared metamaterial phase holograms," Nat. Mater. 11, 450-454 (2012).

Lawrie, J. L. et al., "Size-Dependent Infiltration and Optical Detection of Nucleic Acids in Nanoscale Pores," IEEE Trans. Nanotechnol. 9, 596-602 (2010).

Zheludev, N. I. et al., "From metamaterials to metadevices" Nat Mater 11, 917-924 (2012).

Lee, S. et al., "Fabrication of the Funnel-Shaped Three-Dimensional Plasmonic Tip Arrays by Directional Photofluidization Lithography," ACS Nano 4, 7175-7184 (2010).

Levy, U. et al., "Design, fabrication, and characterization of circular Dammann gratings based on grayscale lithography," Opt. Lett. 35, 880-882 (2010).

Low, S. P., Williams, K. A., Canham, L. T. & Voelcker, N. H. Evaluation of mammalian cell adhesion on surface-modified porous silicon. Biomaterials 27, 4538-4546 (2006).

(56) References Cited

OTHER PUBLICATIONS

Park, J. H. et al., "Biodegradable luminescent porous silicon nanoparticles for in vivo applications," Nat. Mater. 8, 331-336 (2009).
Ruffato, G. et al., "Nanoporous gold plasmonic structures for sensing applications," Opt. Express 19, 13164-13170 (2011).
Ryckman, J. D. et al., "Direct Imprinting of Porous Substrates: A Rapid and Low-Cost Approach for Patterning Porous Nanomaterials," Nano Lett. 11, 1857-1862 (2011).
Sardana, N. et al., "Propagating surface plasmons on nanoporous gold," J Opt Soc Am B 29, 1778-1783 (2012).
Schleunitz, A. et al., "Selective profile transformation of electron-beam exposed multilevel resist structures based on a molecular weight dependent thermal reflow," J Vac Sci Technol B 29, F302 (2011).
Sondergaard, T. et al., "Plasmonic black gold by adiabatic nanofocusing and absorption of light in ultra-sharp convex grooves," Nat. Commun. 3 (2012).
Sun, W. et al., "Nano- to microscale porous silicon as a cell interface for bone-tissue engineering," Adv Mater 19, 921 (2007).
Tascotti, E. et al., "Mesoporous silicon particles as a multistage delivery system for imaging and therapeutic applications," Nat. Nanotechnol. 3, 151-157 (2008).
United States Patent Office Action for U.S. Appl. No. 13/825,152 dated Apr. 7, 2014 (18 pages).
Urquhart, K. S. et al., "Computer-Generated Holograms Fabricated by Direct Write of Positive Electron-Beam Resist," Opt. Lett. 18, 308-310 (1993).
Valentine, J. et al., "An optical cloak made of dielectrics," Nat. Mater. 8, 568-571 (2009).
Waits, C., A. et al., "Investigation of gray-scale technology for large area 3D silicon MEMS structures," Journal of Micromechanics and Microengineering 13, 170-177 (2003).
Wei, X. et al. "Guided mode biosensor based on grating coupled porous silicon waveguide," Opt. Express 19, 11330-11339 (2011).
Wei, X. et al., "Grating couplers on porous silicon planar waveguides for sensing applications," J. Appl. Phys. 104, 3113 (2008).
Xia, Y. N. et al., "Complex optical surfaces formed by replica molding against elastomeric masters," Science 273, 347-349 (1996).
Yang, J. C. et al., "Enhanced Optical Transmission Mediated by Localized Plasmons in Anisotropic, Three-Dimensional Nanohole Arrays," Nano Lett. 10, 3173-3178 (2010).
Yu, F. et al., "Simultaneous excitation of propagating and localized surface plasmon resonance in nanoporous gold membranes," Anal Chem 78, 7346-7350 (2006).
Yu, W. X. et al., "Fabrication of refractive microlens in hybrid $SiO_2$/$TiO_2$ sol-gel glass by electron beam lithography," Opt. Express 11, 899-903 (2003).
Zaumseil, J. et al., "Three-dimensional and multilayer nanostructures formed by nanotransfer printing," Nano Lett. 3, 1223-1227 (2003).
Zentgraf, T. et al., "Plasmonic Luneburg and Eaton lenses. Nat. Nanotechnol," 6, 151-155 (2011).
Zentgraf, T. et al., "An Optical Janus Device for Integrated Photonics," Adv Mater 22, 2561-2564 (2010).
United States Patent Office Interview Summary for U.S. Appl. No. 13/825,152 dated Jun. 27, 2014 (3 pages).
United States Patent Office Final Rejection for U.S. Appl. No. 13/825,152 dated Nov. 13, 2014 (23 pages).
Dreier et al., "Gold Films with imprinted cavities," J. Phys. Chem. Lett., Published on web Nov. 25, 2009, pp. 260-264.
Lee et al., "Imprinting well-controlled nanopore in organosilicate fils," Adv. Mater, 2005.
United States Patent Office Action for U.S. Appl. No. 14/103,811 dated Jun. 9, 2015 (9 pages).
United States Patent Office Final Office Action for U.S. Appl. No. 13/825,152 dated Aug. 13, 2015 (25 pages).
"Platinum-plated nanoporous gold: An efficient, low Pt loading electro-catalyst for PEM fuel cells" to Zeis, Journal of Power Sources 165, (2007) 65-72.
Direct Imprinting of Porous Substrates: A Rapid and Low-Cost. Approach for Patterning Porous Nanomaterials, to Ryckman et al. Pubs. acs.org/Nanolett, pp. 1857-1862 (published on Sep. 17, 2010).

* cited by examiner

DIRECT IMPRINTING OF POROUS SUBSTRATES

CROSS-REFERENCE TO RELATED APPLICATIONS

This application claims priority under 35 U.S.C. §119(e) to U.S. Provisional Patent Application No. 61/182,451 filed on May 29, 2009. The entire contents of this application are hereby incorporated by reference in its entirety.

STATEMENT REGARDING FEDERALLY SPONSORED RESEARCH OR DEVELOPMENT

This invention was made with United States Government support under federal Grant No. W911NF-09-1-0101 awarded by the Army Research Office and with support of the Center for Nanophase Materials Sciences, which is sponsored at Oak Ridge National Laboratory by the Division of Scientific User Facilities. The United States Government has certain rights in this invention.

BACKGROUND

Device fabrication can be carried out using traditional lithography and etching techniques, which are often expensive and limited by a trade-off between resolution and throughput. While nanoimprint lithography ("NIL") and soft lithography strategies may be promising pathways for eliminating this trade-off, such techniques require the use of an intermediate thermoplastic or resist material that must be applied and structured before the pattern can be transferred into the device material. This requires levels of processing complexity that add time and cost to device fabrication.

SUMMARY

In one aspect, a method of imprinting a porous material, the method comprising applying a first stamp to a porous material having a porosity of about 20% to about 95%, and forming protrusions and recesses defined therebetween in the porous material. The method may additionally comprise rotating the first stamp, applying the first stamp to the porous material, and removing the first stamp from contact with the porous material. Alternatively, the method may additionally comprise applying a second stamp to the porous material, wherein the second stamp comprises a different pattern than the first stamp, forming protrusions and recesses defined therebetween in the porous material, and removing the second stamp from contact with the porous material. The porous material may comprise at least one of porous silicon, nanoporous gold, porous alumina, porous titanium dioxide, and mixtures thereof.

In another aspect, a method of imprinting a porous nanomaterial, the method comprising applying a first stamp to a porous nanomaterial, and compressing regions of the porous nanomaterial by at least about 10%. The method may additionally comprise rotating the first stamp, applying the first stamp to the porous nanomaterial, and removing the first stamp from contact with the porous nanomaterial. Alternatively, the method may additionally comprise applying a second stamp to the porous nanomaterial, wherein the second stamp comprises a different pattern than the first stamp, forming protrusions and recesses defined therebetween in the porous material, and removing the second stamp from contact with the porous nanomaterial. The porous nanomaterial may comprise at least one of porous silicon, nanoporous gold, porous alumina, porous titanium dioxide, and mixtures thereof.

In another aspect, a method of imprinting a porous material, the method comprising applying a first stamp to a porous material having a porosity of greater than about 20%, and forming protrusions in the porous material, the protrusions have a height of about 1 nm to about 100 µm. The porous material may comprise at least one of porous silicon, nanoporous gold, porous alumina, porous titanium dioxide, and mixtures thereof.

DETAILED DESCRIPTION

The present application provides methods of patterning porous materials on the micro- and nanometer scale using a direct imprinting technique. The present methods of direct imprinting of porous substrates ("DIPS") can utilize reusable stamps that may be directly applied to an underlying porous material to selectively, mechanically deform and/or crush particular regions of the porous material, creating a desired structure. The process can be performed in a matter of seconds, at room temperature or higher temperatures, and eliminates the requirement for intermediate masking materials and etching chemistries.

Porous materials, such as, for example, porous silicon ("pSi"), porous alumina ("pAl$_2$O$_3$"), nanoporous gold ("np-Au"), titanium dioxide nanotube arrays ("TiO$_2$-NTAs"), and many others, are characterized by nanoscale voids and high specific surface area that give rise to desirable optical, electrical, chemical, and mechanical properties.

While the formation of such porous materials is self-organizing and often remarkably straightforward, subsequent micro- and nanometer scale structuring of these materials is necessary for realizing devices with important applications, including drug delivery and imaging, chemical and biological sensing, and catalysis, and for the construction of novel biomaterials, battery anodes, and structures for use in plasmonics, integrated optoelectronics, and solar energy conversion.

As used herein, the term "porous material" refers to a material comprising pores.

As used herein, the term "porous nanomaterial" refers to a porous material where the relevant pore dimensions are on the order of or smaller than about 100 nm.

As used herein, the term "overstamping" refers to a stamping process in which a stamp is imprinted all the way into a porous material, such that the entire stamp surface is brought into contact with the substrate, and resulting in a patterned structure that can be easily detached from the substrate.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It also is specifically understood that any numerical value recited herein includes all values from the lower value to the upper value, i.e., all possible combinations of numerical values between the lowest value and the highest value enumerated are to be considered to be expressly stated in this application. For example, if a concentration range or a beneficial effect range is stated as 1% to 50%, it is intended that values such as s 2% to 40%, 10% to 30%, or 1% to 3%, etc. are expressly enumerated in this specification. These are only examples of what is specifically intended.

Figure 1:
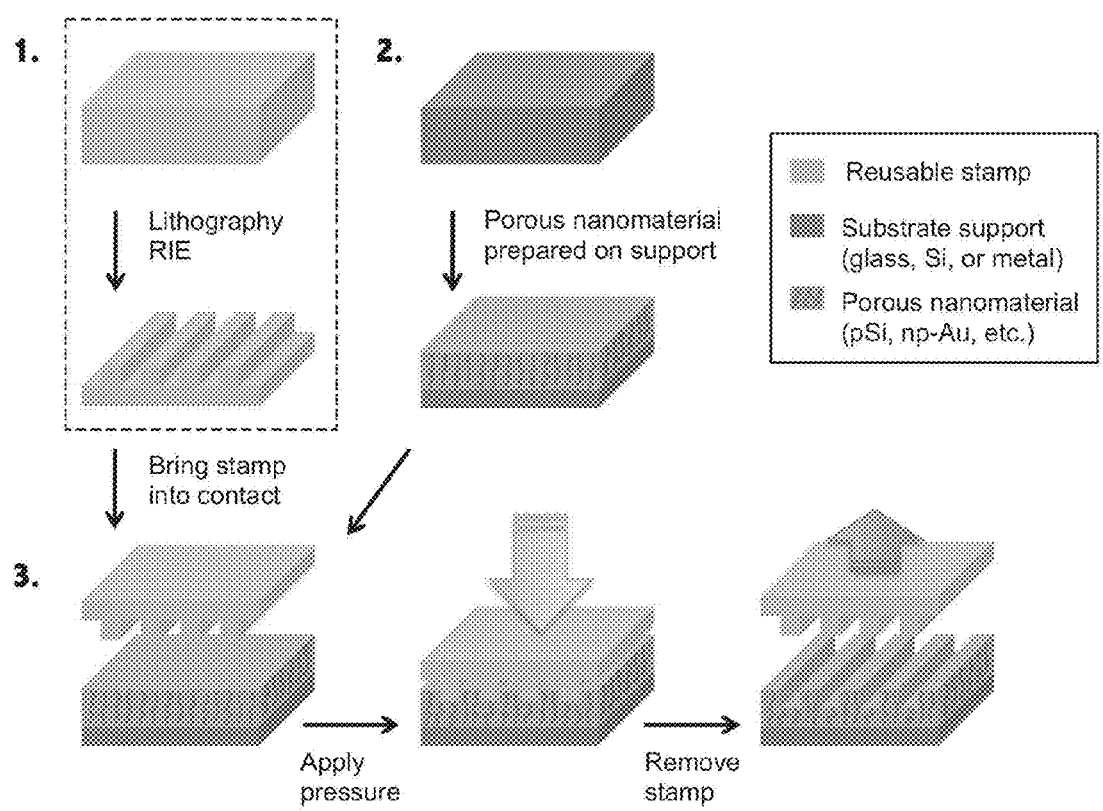
FIG. 1 shows a process of direct imprinting of a porous substrate ("DIPS") according to the present application.

Embodiments of the present application provide DIPS processes that exploit the heterogeneous void network of porous materials by applying a stamp to selectively compress or crush localized regions of the underlying porous material. FIG. 1 shows an embodiment of a DIPS process.

Referring to FIG. 1, a reusable stamp is patterned by standard lithography and reactive-ion-etching. Suitable stamp materials may be constructed from silicon, germanium, ceramics, or other semiconductor materials, including, but not limited to type III-V materials and carbide coated materials. The porous material is prepared on a substrate. The substrate may comprise at least one of silicon, glass, metal, quartz, plastic, and combinations thereof. The stamp is then imprinted into the porous material, thereby selectively compressing localized regions of the porous material by means of an applied pressure. The stamp is then removed from the substrate, revealing the desired structure. The application of the stamp may form a plurality of protrusions extending form the porous material. The protrusions may define recesses therebetween. Each protrusion and recess may have a height and a width. The width of the protrusion may be from about 100 μm to about 1 nms, and more particularly from about 1000 nm to about 10 nm. The width of the recesses may be from about 1 nm to about 100 μm, and more particularly from about 10 nm to about 100 nm. In some embodiments, the height of the protrusions or recesses may be less than about 100 μm, about 50 μm, about 20 μm, about 10 μm, about 100 nm, about 95 nm, about 90 nm, about 80 nm, about 75 nm, about 70 nm, about 65 nm, about 60 nm, about 55 nm, about 50 nm, about 45 nm, about 40 nm, about 35 nm, about 30 nm, about 25 nm, about 20 nm, about 15 nm, about 10 nm, about 5 nm, about 3 nm, and less than about 1 nm. The height of the protrusions or recesses may be greater than about 1 nm, about 5 nm, about 10 nm, about 15 nm, about 20 nm, about 25 nm, about 30 nm, about 35, about 40, about 45, about 50, about 55, about 65, about 70, about 75, about 80, about 85, about 90, about 95, and greater than about 100 nm. In some embodiments, the height of the protrusions or recesses may be 1 nm to about 100 μm, and more particularly from about 100 nm to about 10 μm. In some embodiments, the height of the protrusions or recesses may be from about 1 nm to about 5 nm.

Further device processing of the patterned porous material can then be performed, such as, for example, imprinting the porous material with a first stamp at least a second time, where the first stamp has been rotated by, for example, 90 degrees for the at least second imprinting, or imprinting the porous material at least a second time with a second stamp, where the second stamp can have the same pattern as the first stamp or a different pattern.

Porous Materials

Porous materials, such as, for example, porous silicon ("pSi"), porous alumina ("pAl$_2$O$_3$"), nanoporous gold ("np-Au"), titanium dioxide nanotube arrays ("TiO$_2$-NTAs"), and many others, are characterized by nanoscale voids and high specific surface area that give rise to desirable optical, electrical, chemical, and mechanical properties. The pores of the material may be smaller than about 10 μm, typically smaller than about 1 μm, and more typically smaller than about 100 nm. The porosity may be less than about 100 μm, less than about 50 μm, less than about 10 μm, less than about 5 μm, less than about 1 μm, less than about 500 nm, less than about 100 nm, less than about 50 nm, less than about 10 nm, less than about 5 nm.

Porous materials that may be used in the structures described herein may include, but need not be limited to, porous silicon, porous gold, porous aluminum, porous copper, porous silver, porous germanium, porous tin, porous silicon dioxide, porous aluminum oxide, porous titanium dioxide, or a mixture thereof. The porous materials may be nanomaterials. As used herein, porosity refers to the ratio of the volume of empty space over the volume of a unit structure, for material. For example, in some embodiments, each protrusion of the grating may be described as a very small porous rectangle L×H×W, and the porosity is the volume of empty space per the L×H×W volume. Because the porosity is a ratio, it is unitless. Porosity may be reported as a decimal number, a fraction, or a percentage.

The porosity of the materials used herein may be greater than about 10%, typically greater than about 50%, more typically greater than about 70%. The porosity may be greater than about 10%, about 15%, about 20%, about 25%, about 30%, about 35%, about 40%, about 45%, about 50%, about 55%, about 60%, about 70%, about 75%, about 80%, about 85%, about 90%, or greater than about 95%. Porosity of the porous material generally can vary from about 10% porosity to about 95%, and more particularly, about 20% to about 95% porosity.

Porous materials offer a large internal surface area (about 100 m$^2$/cm$^3$) and highly tunable pore dimensions, making them particularly interesting for use in a variety of applications including photovoltaics, integrated optics, drug-delivery, and sensing of biological and chemical species. The fabrication of many types of porous materials is remarkably straightforward, as pores are self-organizing and readily produced using electrochemical methods. Precise control over pore morphology can be obtained by varying anodization parameters such as current density, voltage, electrolyte composition, substrate doping, and process temperature. See, e.g., Li et al., "Hexagonal pore arrays with a 50-420 nm interpore distance formed by self-organization in anodic alumina," (1998) J. Appl. Phys. 84, 6023-6026; Ding et al., "Nanoporous gold leaf: 'ancient technology'/advanced material," (2004) Adv. Mater. 16, 1897-1900; Kasuga et al., "Formation of titanium oxide nanotube," (1989) Langmuir 14, 3160-3163; and Smith et al., "Porous silicon formation mechanisms," (1992) J. Appl. Phys. 71, R1-R22, each of which is incorporated by reference in its entirety.

In porous silicon ("pSi") for example, pore diameters ranging from less than 2 nm to greater than 3 μm have been demonstrated. Moreover, as a porous material, composed of part air and part silicon, porous silicon can potentially be crushed or compressed. For example, under ideal circumstances, a 50% porosity layer of porous silicon could be compressed to half of its initial thickness i.e., 50% compression, where contacted by a stamp. Alternatively, porous silicon may simply be crushed in selected regions and debris then washed away.

In some embodiments, the porous material may include, for example, at least one of porous silicon ("pSi"), porous alumina ("pAl$_2$O$_3$"), nanoporous gold ("np-Au"), titanium dioxide nanotube arrays ("TiO$_2$-NTAs"), and combinations thereof.

Thickness of the porous material commonly can vary from about 50 nm to about 100 μm, and more particularly, from about 100 nm to about 10 μm.

In some embodiments, the porous material may be subjected to subsequent conditioning, such as, for example, oxidation in the case of pSi.

Substrates

In some embodiments, a porous material may be prepared on a substrate support. The substrate may comprise, for example, at least one of silicon, glass, metal, quartz, plastic, or combinations thereof. In some embodiments, the substrate can be a solid substrate. In some embodiments, the substrate may preferably include solid silicon.

Stamps

Stamps used in embodiments of the present application generally have a hardness greater than the hardness of the material being imprinted and can be pre-mastered i.e., they may have a patterned surface or surfaces. Pre-mastering of a stamp can be accomplished through conventional lithographic techniques, such as, for example, photolithography, reactive ion etching, electron beam lithography, wet etching, dry etching, focused ion-beam milling, laser machining, and combinations of these methods. In some embodiments, a pre-mastered stamp may be a reusable stamp. In some embodiments, a stamp material may comprise silicon. Other suitable materials include metals and polymeric materials. In some embodiments, the stamp may comprise a material with a material hardness of at least about 1 GPa, about 3 GPa, about 5 GPa, about 8 GPa, about 10 GPa, about 15 GPa, or at least about 20 GPa.

A stamp pattern can include any desired pattern, such as, for example, straight lines, curved lines, dots, circles, ovals, polygons, irregular shapes, etc. and combinations thereof. Some embodiments may include a stamp (about 9 mm$^2$ area) including a grating pattern, with pitches of, for example, about 350 nm, about 550 nm, about 750 nm, about 1.7 μm, about 5 μm, and about 10 μm.

Applied Pressures

Applied pressures suitable for methods of the present application may commonly include pressures of about 50 N/mm$^2$ to about 500 N/mm$^2$, and more particularly, about 100 N/mm$^2$ to about 300 N/mm$^2$. In some embodiments, the applied pressure may be at least about 50, about 55, about 65, about 70, about 75, about 80, about 85, about 90, about 95, about 100, about 125, about 150, about 175, about 200, about 225, about 250, about 250, about 275, and at least about 300 N/mm$^2$.

Temperatures

Methods of the present application can commonly be carried out at temperatures ranging from about 15° C. up to about 1,200° C., particularly from about 20° C. up to about 200° C., or more particularly from about 21° C. to about 27° C.

Imprinting and Overstamping

Imprinting and overstamping may be accomplished by contacting the stamp with the porous material, exerting pressure as set forth above, and removing the stamp as set forth in FIG. 1. Methods of the present application can afford precise control over both lateral and vertical dimensions of patterning in a porous material while maintaining large area uniformity. In some embodiments of the present application, tunable imprint depths in the range of about 10 nm to about 1 μm, as well as lateral feature sizes below about 100 nm can be realized. The imprints may be less than about 100 μm, about 50 μm, about 20 μm, about 10 μm, about 100 nm, about 95 nm, about 90 nm, about 80 nm, about 75 nm, about 70 nm, about 65 nm, about 60 nm, about 55 nm, about 50 nm, about 45 nm, about 40 nm, about 35 nm, about 30 nm, about 25 nm, about 20 nm, about 15 nm, about 10 nm, about 5 nm, about 3 nm, and less than about 1 nm. The imprints may be greater than about 1 nm, about 5 nm, about 10 nm, about 15 nm, about 20 nm, about 25 nm, about 30 nm, about 35 nm, about 40 nm, about 45, about 50, about 55, about 65 nm, about 70 nm, about 75 nm, about 80, about 85, about 90, about 95, and greater than about 100 nm. In some embodiments, the lateral feature size may be less than about 100 nm, about 95 nm, about 90 nm, about 80 nm, about 75 nm, about 70 nm, about 65 nm, about 60 nm, about 55 nm, about 50 nm, about 45 nm, about 40 nm, about 35 nm, about 30 nm, about 25 nm, about 20 nm, about 15 nm, about 10 nm, about 5 nm, about 3 nm, and less than about 1 nm. Imprinted structures may be characterized by scanning electron microscopy ("SEM"), atomic force microscopy ("AFM"), and optical diffraction experiments.

In some embodiments, the imprint depth in the porous material can be less than about 1%, less than about 3%, less than about 5%, less than about 8%, less than about 10%, or less than about 15% of the height of the porous material that has not been imprinted. In some embodiments, the imprint depth can be greater than about 1%, greater than about 3%, greater than about 5%, greater than about 7%, greater than about 10%, greater than about 15%, and greater than about 20% of the height of the porous material that has not been imprinted.

In some embodiments, the stamp compresses regions of the porous material by less than about 20%, less than about 17%, less than about 15%, less than about 13%, less than about 10%, less than about 8%, less than about 5%, less than about 3%, less than about 2%, and less than about 1% up to about the porosity of the film (e.g., up to about 80% compression for an 80% porosity pSi, up to about 50% compression for a 50% porosity np-Au, etc.) relative to the porous material that has not been compressed. In some embodiments, the stamp can compress regions of the porous material by at least about 3%, at least about 5%, at least about 8%, at least about 10%, at least about 13%, at least about 15%, at least about 18%, at least about 20%, at least about 25%, at least about 30%, at least about 35%, or at least about 40% relative to the porous material that has not been compressed.

In some embodiments, the stamp can be in contact with the porous material for about one second to about 2 minutes, particularly from about 1 second to about 5 seconds. In other embodiments, the stamp can be in contact for less than one second, and less than one half of one second.

In some embodiments, a single stamp may be used to contact the porous material at least a second time, where the stamp can be rotated, for example, greater than 90 degrees, about 90 degrees, or less than 90 degrees, between imprinting the porous material a first time and imprinting the porous material at least a second time. In some embodiments, more than one stamp may be used to contact the porous material, where the second stamp may include the same pattern as the first stamp or a different pattern than the first stamp. The second stamp may also be used to contact the porous material at least a second time, where the second stamp can be rotated, for example, greater than 90 degrees, about 90 degrees, or less than 90 degrees, between imprinting the porous material a first time with the second stamp and imprinting the porous material at least a second time with the second stamp.

In some embodiments, overstamping may produce a freestanding nanoparticle or microparticle. (See, e.g., FIG. 17). Generally, to produce a freestanding nanoparticle or microparticle, some region of the film can be imprinted to a significant fraction, i.e. approaching the original porosity of the film. For example, in some embodiments a first imprint fraction can be greater than 70% (see, e.g., FIG. 16a, region 1), followed by a second imprint region, imprinted often at least to about 10%.

One embodiment provides a large area (9 mm$^2$) stamp applied to single layer thin films of porous silicon with a force on the order of 1 kN.

Device Structures

Potential device applications for porous materials patterned as described in the present application span areas including photovoltaics, drug-delivery, chemical and biological sensing, and optoelectronics. Applications described below include: stamped porous waveguides with no additional scattering losses introduced, porous ring resonators, porous gratings (e.g., porous diffraction gratings with sensing capabilities), regular arrays of porous particles that can be released from the substrate, and arbitrary shapes of porous materials, including text. Gratings, and sensors using the gratings, may be produced with direct imprinting of the porous materials. The gratings and sensors are described in more detail in U.S. patent application Ser. No. 12/790,905 "Diffraction Gratings Comprising Porous Materials and Diffraction-Based Sensors Comprising Porous Materials" by S. M. Weiss et al., filed May 31, 2010, and incorporated by reference herein in its entirety.

Methods of the present application are well suited for preparation of surface plasmon resonance surfaces, subwavelength photonic as well as plasmonic structures, including but not limited to waveguides, gratings, resonators and related devices, arrays, which could be used, for example, in rapid high throughput assays, and particles.

EXAMPLES

Example 1

Preparation of Porous Materials

Methods of producing pSi at various film thicknesses are known in the art. For example, by varying the electrochemical preparation conditions, high porosity ("HP") and low porosity ("LP") films, estimated at about 80% and about 55% respectively, 80% porosity, formed by 80 mA/cm$^2$ current density, 55% formed by 5 mA/cm$^2$, can be prepared.

Samples of pSi were prepared by electrochemical etching of a boron doped p+ type Si(100) with a resistivity of 0.01-0.02 Ωcm and a thickness of 475-550 μm (University Wafer) in a mixture of 49% hydrofluoric acid (HF):ethanol mixture with a ratio of 3:7 (v/v). High-porosity (about 80% porosity) and low-porosity (about 55% porosity) films were electrochemically prepared at current densities of 80 mA cm$^{-2}$ and 5 mA cm$^{-2}$ respectively.

Porosity characterization of pSi films. The reflectance spectra of pSi thin films were measured with a spectrophotometer (Varian Cary 5000 UV-VIS-NIR) and subsequently modeled using a two-component (Si and void) Bruggeman effective medium approximation in a transfer-matrix formalism. This was performed following cross sectional SEM to estimate the original film thickness, and etching rate, for each current density utilized. Aside from optical modeling, porosity can also be estimated by gravimetric methods, wherein the mass of the substrate is measured before porous film formation, after formation, and after dissolution of the film.

Samples of np-Au were prepared from an approximately 1.5×1.5 cm sheet of one hundred nanometer thick Monarch 12 Karat white gold that was dealloyed by floating on concentrated nitric acid (Fisher) for 15 minutes, followed by mounting on substrate supports. The porosity was estimated to be about 50%.

Hexagonally ordered pAl$_2$O$_3$ was prepared by anodization of high purity 0.100 mm thick Al foil (Reynolds Aluminum), in 0.3M oxalic acid electrolyte. The pores were subsequently opened in a bath of phosphoric acid (5% wt) for 90 minutes. TiO$_2$-NTAs were prepared from 0.25 mm thick Ti foil (99.7%, Sigma Aldrich), cut into 2×2 cm squares that were first sonicated in isoproponal and then acetone, each for 10 min. Samples were then anodized at 80V for 5-18 hrs in a two-electrode configuration utilizing a electrolyte solution of NH$_4$F (0.3% by weight) and water (0.1% by volume) in ethylene glycol, and subsequently annealed at 450° C. for 3 hrs with a 3.5 hr ramp up/down time.

Stamp Preparation and Imprinting

Silicon stamps were prepared from the same wafers used to prepare the pSi samples in Example 1. Standard photolithography and reactive ion etching were used to pattern the microscale ($\Lambda$=5, 10 μm) grating stamps. All other stamp patterns were defined by electron-beam lithography followed by: (i) electron-beam evaporation of a 10 nm Cr mask layer, (ii) lift-off in acetone, and (iii) subsequent reactive ion etching to a depth of approximately 0.5 μm (except for the submicrometer period gratings, which skipped steps i and ii).

Imprinting was performed with a Tinius Olsen Super L 60K universal testing machine configured to apply a flat metallic plate onto the backside of the stamp, which was fixed face down on the porous material with single sided Scotch Tape. After bringing the plate into contact with the backside of the stamp, a computer-controlled force was delivered and sustained for less than 1 second.

DIPS with pSi

Figure 2:
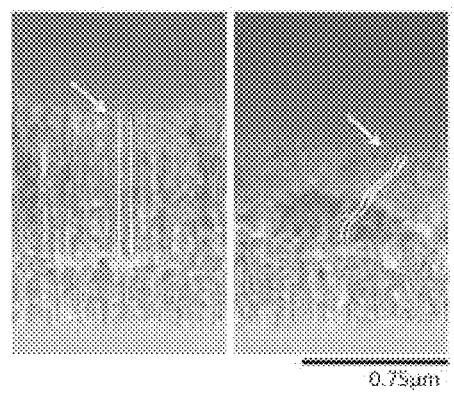
FIG. 2 shows imprinting behavior of an approximately 1 µm thick pSi film.

FIG. 2 shows the imprinting behavior of an approximately 1 μm thick pSi film, with pore diameters on the order of 30-40 nm (prepared by electrochemical etching at 48 mA cm$^{-2}$ for 35 seconds). FIG. 2 (left) shows an SEM image of the pSi film before imprinting. FIG. 2 (right) shows an SEM image of the pSi film after imprinting with a grating patterned stamp (area=9 mm2, $\Lambda$=5 um) at a force of about 2 kN. The imprinted regions were compressed to a thickness of approximately 615 nm.

FIG. 2 shows cross-sectional SEM images (45° tilt) of unstamped (left) and stamped (right) regions of a 1 μm thick pSi film (the white arrows indicate highlighted typical pores). As shown in FIG. 2 (right), the mesoporous network accommodated the reduction in volume by bending and compressing pores together. In this case, the porous structure appeared to be contiguous and unbroken.

After DIPS imprinting, the sample was placed back in the electrochemical cell to determine if the densified porous network would prevent the etching of a second layer (20 mA cm$^{-2}$, 30 s). SEM imaging (FIG. 2) revealed that the etching of a second porous layer proceeded uniformly in both the printed and unprinted regions; the ethanolic HF etching solution readily infiltrated the entire imprinted pSi layer, and reinitiated etching where the pores were previously terminated. This opens the possibility of fabricating devices through a multi-step process, where further electrochemical etching can be performed following DIPS.

Grating Coupled pSi Waveguide

Figure 3:
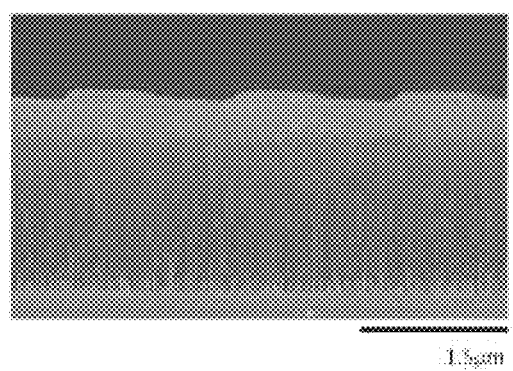
FIG. 3 shows an SEM image of a grating coupled pSi waveguide fabricated with DIPS in a multistep process.

As an example of a device structure that would benefit from a multi-step process, a grating-coupled porous silicon waveguide was prepared (FIG. 3). Grating coupled pSi waveguides function by coupling diffracted light into a waveguide mode which confines light in a high refractive index layer through total internal reflection. A pSi structure can readily achieve the refractive index contrast necessary for waveguiding by modulating the porosity (and thus the effective refractive index).

The structure of FIG. 3 was fabricated by first etching a thin (about 200 nm) high-porosity (about 80%) cladding layer followed by a low porosity (about 55%) waveguiding core layer (about 300 nm thick). DIPS was then performed with a silicon-grating stamp ($\Lambda$=1.7 μm), and followed by further electrochemical etching of a 1.5 μm thick high-porosity cladding layer.

Imprint Depth

Figure 10:
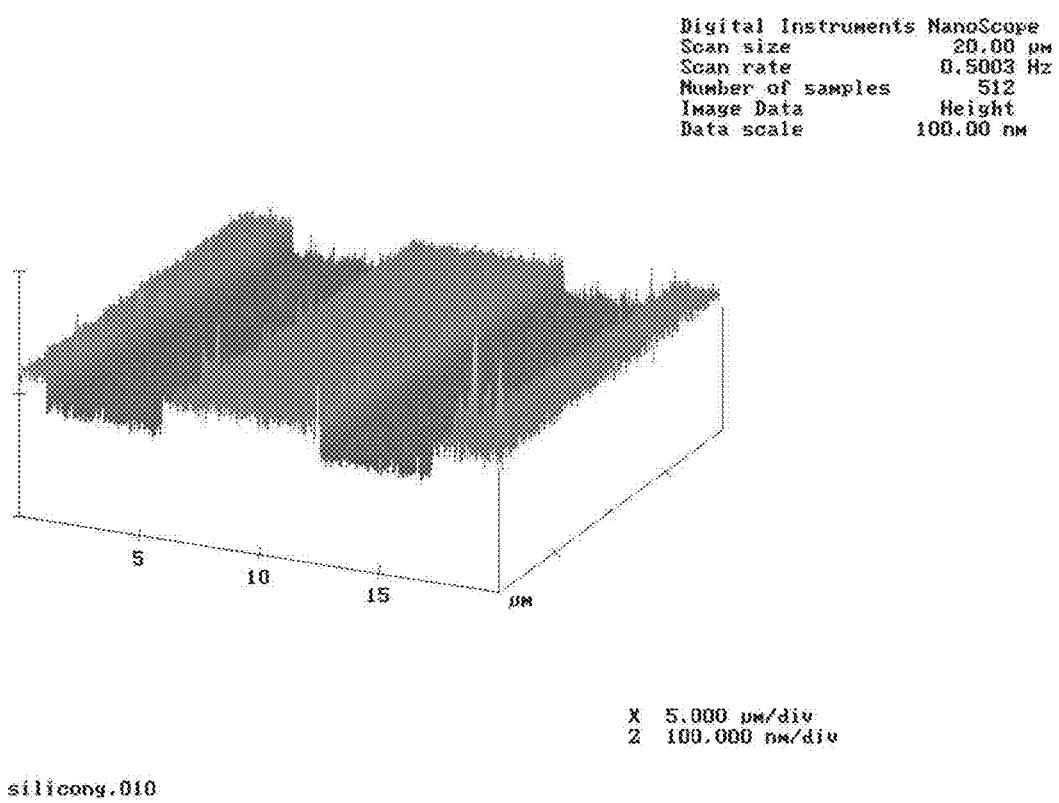
FIG. 10 shows AFM measurement of a pSi thin film after imprinting with a silicon grating patterned stamp.

From work on nano-indentation, it was expected that imprint depth would depend on the pressure applied to the stamp, the hardness of the material being imprinted, and the stamp geometry. FIG. 10 shows and example AFM measurement of a pSi thin film after imprinting with a silicon grating patterned stamp ($\Lambda$=10 μm, area=9 mm$^2$).

Figure 4:
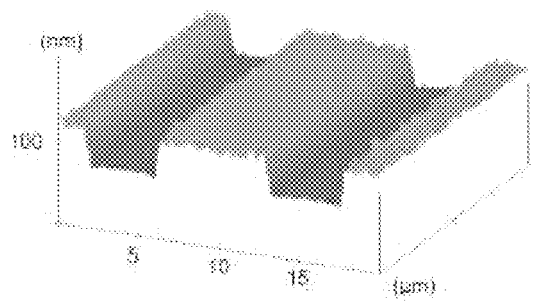
FIG. 4 shows an AFM height image of a typical pSi thin film after performing DIPS.
Figure 5:
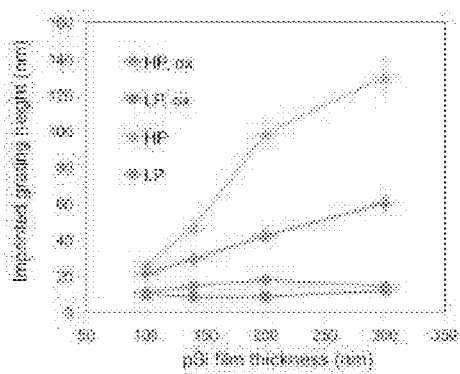
FIG. 5 shows the variation of imprinted grating height for pSi thin films for various film thicknesses and preparation conditions.
Figure 11:
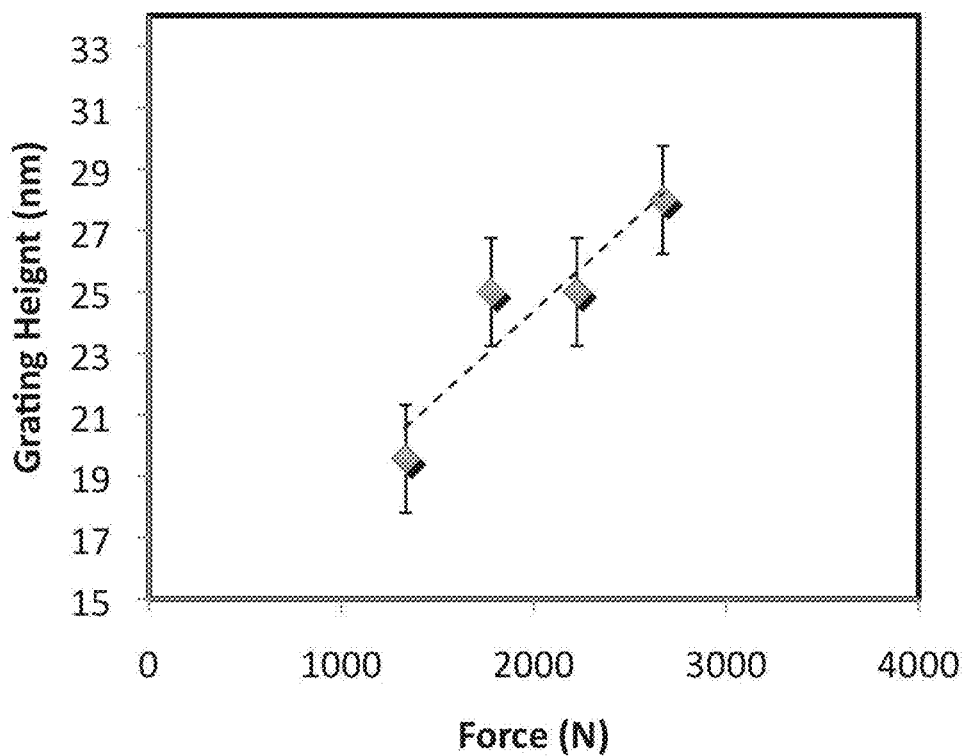
FIG. 11 shows variation of imprint depth as a function of applied force for a 100 nm thick, 80% porosity pSi substrate oxidized in air ambient at 500° C. for 5 minutes.

As shown in FIG. 11, the imprint depth scales with the applied pressure. What is perhaps more interesting is how porous nanomaterial properties, such as porosity, thickness, or subsequent conditioning, for example, oxidation in the case of pSi, affect the imprint depth through variations of material hardness. Atomic force microscopy ("AFM") (see FIG. 4 and FIG. 5) shows that the imprint depth depends in important ways on all of these parameters.

Characterization of DIPS Process to Investigate Porosity, Thickness, and Conditioning Effects These parameters were examined through a standardized DIPS process utilizing a grating patterned stamp (area=9 mm2, $\Lambda$=10 μm) applied to porous substrates at a fixed force (~2 kN). By varying the electrochemical preparation conditions as described above, high porosity ("HP") and low porosity ("LP") films i.e., "as-etched" films, were fabricated, estimated at about 80% porosity and about 55% porosity respectively, at a number of different film thicknesses. Duplicate samples were also prepared and treated with oxidation in ambient air at 500° C. for 5 min i.e., "oxidized" films, to examine conditioning effects.

Atomic force microscopy ("AFM") measurements (FIG. 4 and FIG. 5) revealed that oxidized and as-etched LP films exhibited imprint depths that were approximately constant with film thickness, whereas oxidized and as-etched HP films exhibited a trend of increasing imprint depth with increasing film thickness. While not wishing to be bound by a particular theory, the observed variation of imprint depth on HP films may be attributed to changes in effective hardness that arise when the imprint depth is greater than 10% of the film thickness. Thus, the underlying silicon substrate contributes more to the effective hardness of HP pSi as the film thickness is reduced. In other words, thinner HP films have a larger hardness that is manifested in the form of smaller imprint depths, while LP films exhibit a nearly constant hardness because the fractional imprint depth is not greater than 10% of the pSi film thickness. In all cases, oxidized samples imprinted to shallower depths than their un-oxidized counterparts. Though not wishing to be bound by a particular theory, this behavior may be attributed to oxide growth simultaneously reducing porosity and strengthening the interconnected mesoporous network. This behavior can probably be generalized to other porous nanomaterials. Thus, by tuning the applied pressure and the film preparation conditions, very precise, nanometer-scale control over the imprint depth can be achieved.

Figure 6:
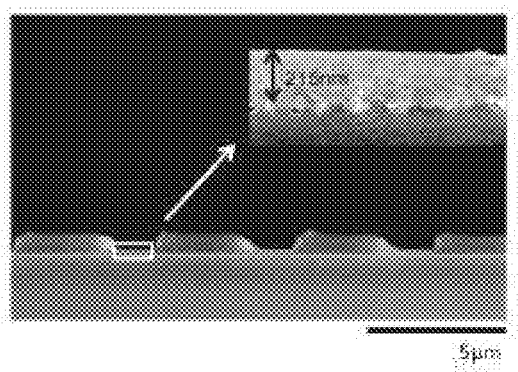
FIG. 6 shows an SEM image of a pSi grating fabricated by imprinting a 1 µm thick HP film to a depth of 785 nm (the inset reveals a crushed pSi film remaining in the imprinted regions).

Imprinting porous structures to a depth that is a significant fraction of the original film thickness was investigated. This is particularly relevant for devices where a large aspect ratio is required. Assuming that volume reduction is accommodated primarily by a compression of the pores and a reduction of the void fraction, then the theoretical limit of the maximum imprintable film fraction should equal the original porosity of the film. This limit was approached by imprinting a 1 μm thick pSi film, with an initial porosity estimated at ~80%, using an increased pressure (approx. 400N/mm2). FIG. 6 shows that the porous silicon grating can be imprinted to a depth of 785 nm, very close to the theoretical limit of 800 nm. In this case the imprinted region no longer resembled the compressed porous structure of FIG. 2, but rather resembled a crushed and densified film of broken silicon crystallites.

Figure 7:
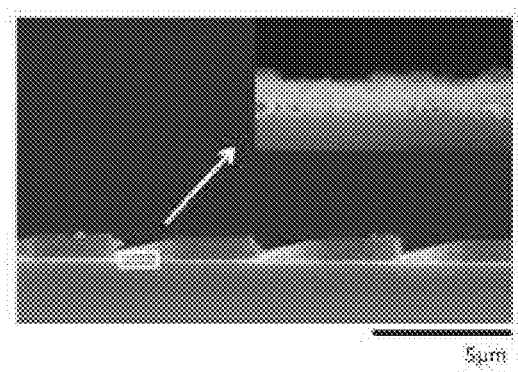
FIG. 7 shows an SEM image of a pSi grating prepared in a similar manner to the pSi grating of FIG. 6, but where the crushed pSi region has been removed.

The broken nature of the crushed film suggests that there no longer exists robust adhesion to the substrate, and indeed, with ultrasonication, the crushed region of pSi can be removed to reveal a "pSi only" grating (FIG. 7). In this manner, imprinted structures can be produced with micro-scale vertical features and aspect ratios that exceed those of the stamp itself.

Imprint Patterns

Figure 8:
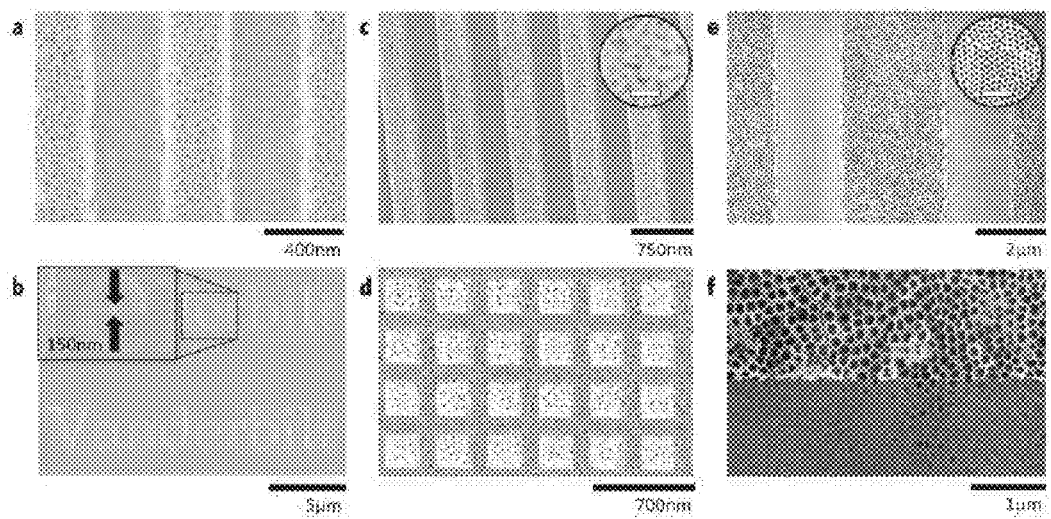
FIG. 8 shows top view scanning electron microscope (SEM) images of porous nanomaterials patterned with DIPS.
Figure 12:
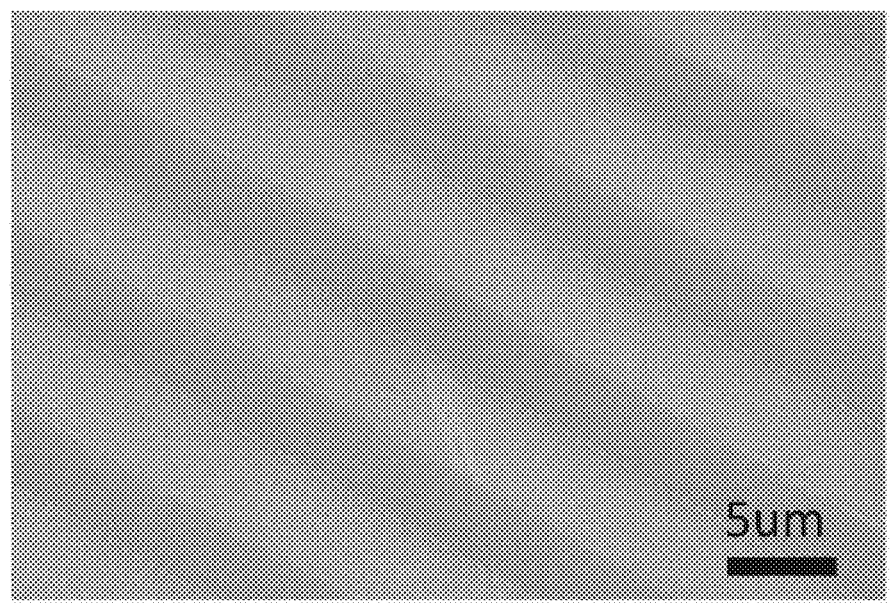
FIG. 12 shows a 10 µm period grating imprinted into ~80% porosity pSi.
Figure 13:
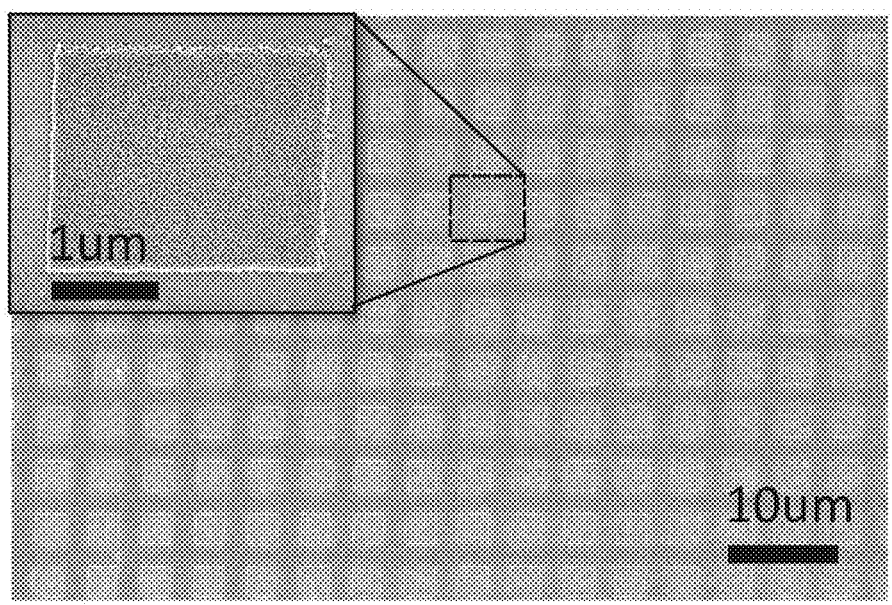
FIG. 13 shows a microscale square array of pSi fabricated by imprinting with a 5 µm period grating, rotating 90 degrees and stamping again.

FIGS. 8a and 8c show pSi and np-Au, respectively, after performing DIPS with a grating patterned stamp (area=9 mm2, Λ=750 nm), and demonstrate the ability to pattern sub-micrometer features over large areas. In FIG. 8a, the pSi mean pore diameter is approximately 20-30 nm. In FIG. 8c, the inset reveals the original pore morphology (scale bar=100 nm). The observed sidewall roughness is not surprising; indeed, it confirms that the dimension of the pore diameter fundamentally limits the resolution of pattern transfer, as expected. DIPS is capable of patterning sub-wavelength optical structures of arbitrary nanoscale shapes, limited only by this resolution. This is demonstrated with the imprinting of text into pSi (in 3 μm size font) that contains details smaller than 100 nm, as shown in FIG. 8b. FIG. 8b shows pSi imprinted with 3 μm font "Vanderbilt" text. Alternatively, patterns can be easily scaled to produce larger, micron-scale features and patterned arrays in pSi films, as shown in FIGS. 12 and 13.

FIG. 8d shows np-Au square mesh produced by imprinting with a silicon grating (Λ=350 nm), rotating 90 degrees and imprinting again. This demonstrates that 'step and print' structures can be constructed, where a stamp is shifted or rotated multiple times between imprints in order to achieve structures more complex than that of the stamp itself.

Figure 14:
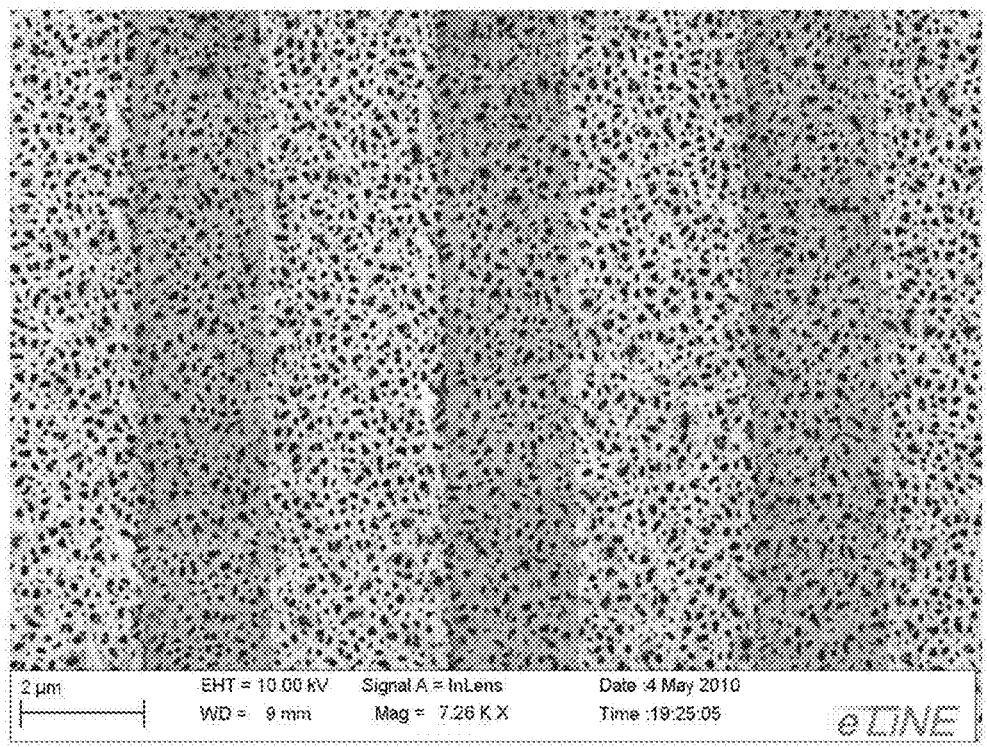
FIG. 14 shows SEM images of imprinted structures on disordered $pAl_2O_3$.
Figure 14:
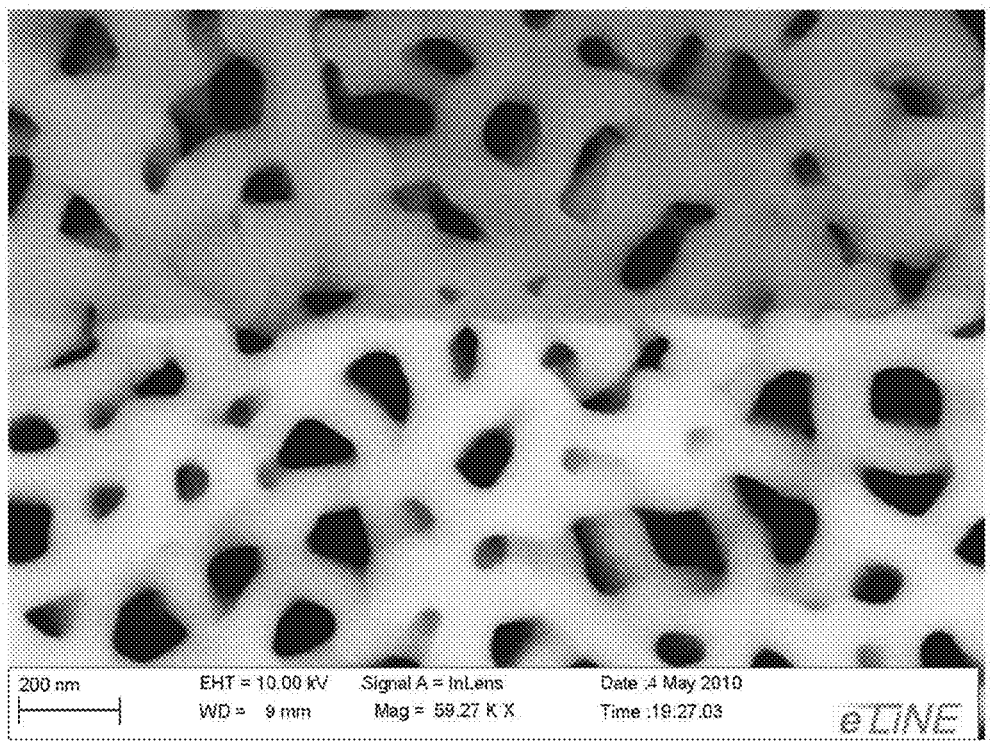

This appears to demonstrate a patterning resolution never before achieved on np-Au. Based on these results, it is expected that DIPS could be employed to realize a new class of low-cost plasmonic devices employing np-Au. DIPS has also been successfully used to imprint hexagonally ordered $pAl_2O_3$ (FIG. 8e) as well as disordered $pAl_2O_3$ (FIG. 14). FIG. 8e shows an imprinted $pAl_2O_3$ grating (Λ=5 μm); the inset reveals the original pore morphology (scale bar=500 nm).

FIG. 14 shows SEM images of imprinted structures on disordered $pAl_2O_3$. Disordered $pAl_2O_3$ was prepared by following previously reported methods and starting from an ~1 um thick Al film sputtered onto an n-type Si substrate, followed by anodization at 80V in 10% wt phosphoric acid solution, and a short 15 minute pore opening step in 5% wt phosphoric acid solution. Imprinting was performed with a Si grating patterned stamp (Λ=5 μm, area=9 mm$^2$) applied at a force of approximately 4 kN.

Figure 15:
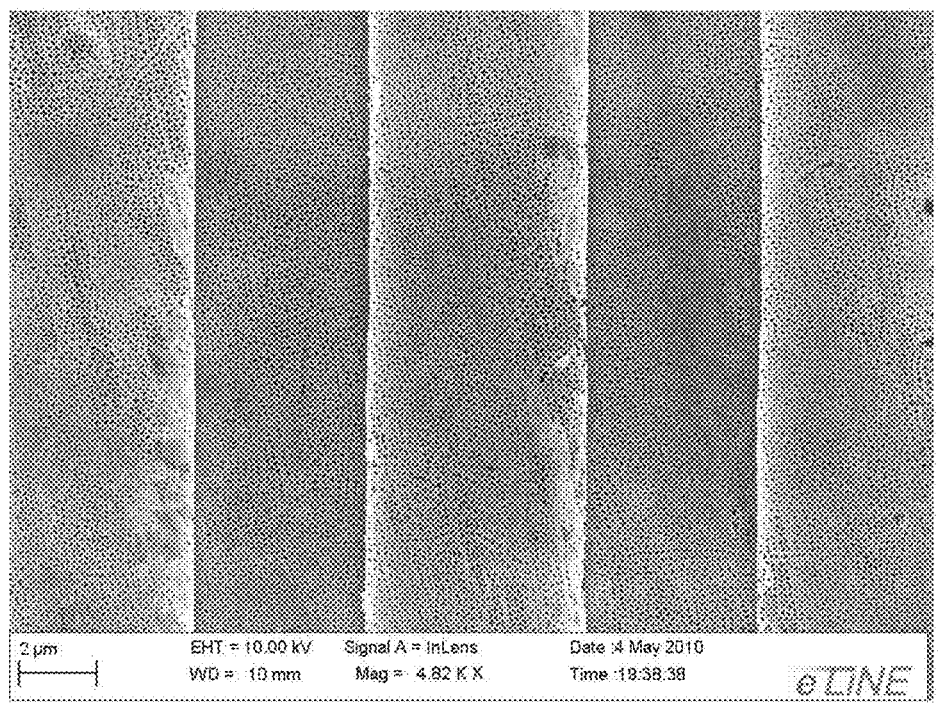
FIG. 15 shows SEM images of imprinted porous TiO2-NTAs imprinted with a silicon grating patterned stamp.
Figure 15:
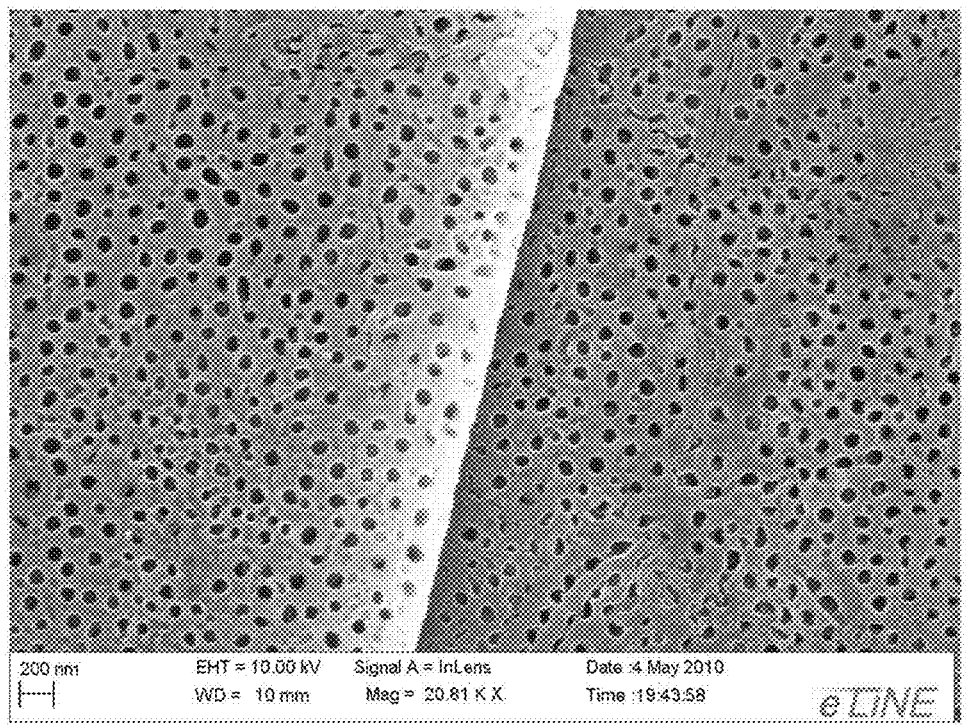

FIG. 8f shows the imprinted and non-imprinted regions of a $TiO_2$-NTA, and reveals results similar to those obtained with other porous nanomaterials (also see FIG. 15). FIG. 15 shows SEM images of imprinted porous $TiO_2$-NTAs imprinted with a silicon grating patterned stamp (Λ=5 μm, area=9 mm$^2$). This sample was prepared by anodization at 65V for 5 hours (as opposed to the 80V sample reported in FIG. 8f). These results indicate that a host of porous materials can be imprinted using DIPS, with excellent pattern reproduction and large area uniformity.

Devices Constructed Using DIPS

Figure 9:
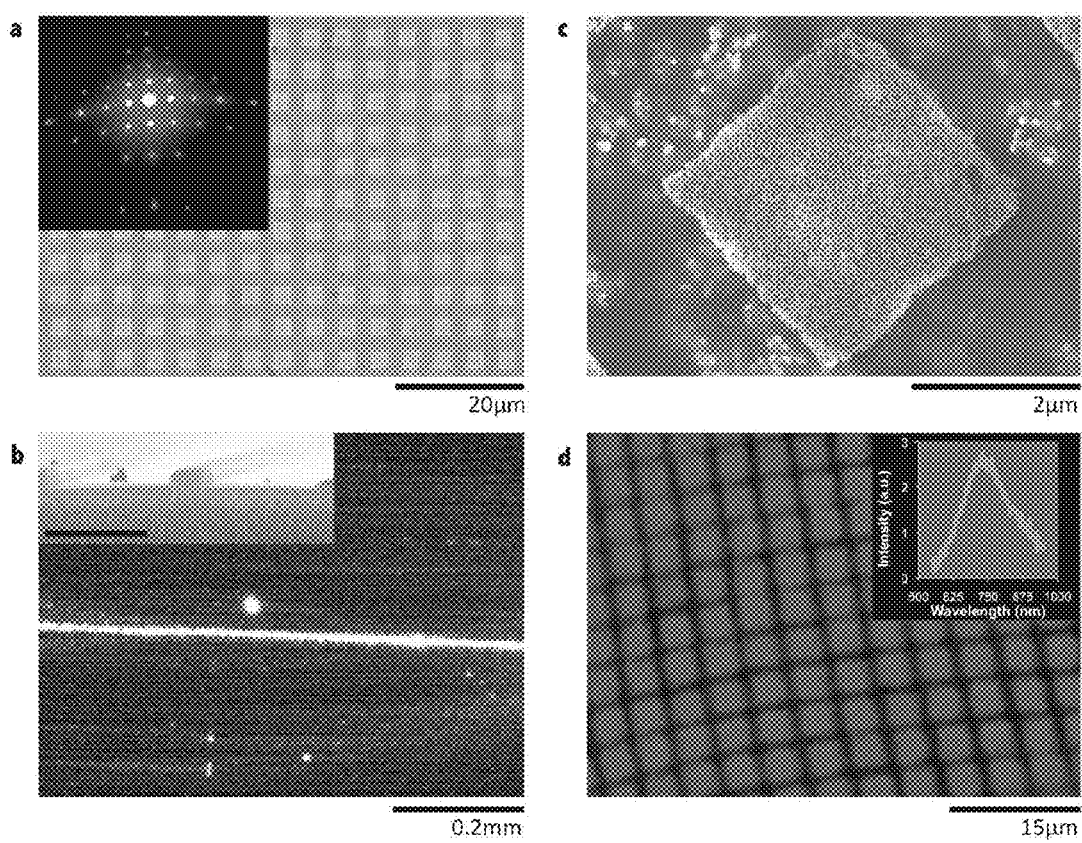
FIG. 9 shows selected device structures fabricated by DIPS.

To suggest the variety of devices that could be constructed using DIPS, several sample structures have been fabricated (FIG. 9). As shown in FIG. 9a, appropriately patterned DIPS structures can be readily used as optical diffraction gratings. FIG. 9a shows an SEM image of a np-Au square diffraction grating (Λ=5 μm), produced in the same manner as in FIG. 2d. The inset reveals the optical diffraction pattern (λ=647 nm) at approximately 15° from normal incidence. FIG. 9a reveals a square diffraction grating fabricated on np-Au on a glass substrate. A clear and distinct diffraction pattern appears due to the large spatial uniformity of the imprinted micro-scale pattern.

The fabrication of diffraction gratings in porous materials is particularly relevant to sensing applications, where the presence of analytes in the porous matrix modifies the effective refractive index of the grating, leading to significant changes in the diffraction signature. This phenomenon has been demonstrated for label-free sensing of small molecules. Porous diffraction gratings could also be utilized to couple light into dielectric waveguides (as in FIG. 3) or to launch surface plasmons in metallic films. Furthermore, grating structures are of particular interest in photovoltaic applications, owing to their ability to couple light into guided mode of thin-film devices for light harvesting.

As a second example, 3D waveguides were fabricated (FIG. 9b) utilizing DIPS on pSi in a multistep process similar to that previously described for the grating coupled 2D waveguide (FIG. 3). FIG. 9b shows a camera image (top view) of a DIPS patterned pSi structure waveguiding near-infrared light (the inset reveals a waveguide SEM cross-section, scale bar is 1 μm). Horizontal confinement of light (coplanar direction) was achieved by imprinting trenches into an about 450 nm thickness medium porosity (about 67%) pSi film prepared at a current density of 20 mA cm-2. Subsequent etching of a 1.8 μm thick high porosity (about 80%) pSi cladding layer (80 mA cm-2) produced the vertical confinement required for waveguiding. An interesting advantage of utilizing photonic structures constructed from porous nanomaterials is the ability to infiltrate various species into the porous network that can then be used in switching, sensing, or light emission applications.

FIGS. 9c and 9d, show freestanding pSi microparticles fabricated using DIPS. FIG. 9c shows an SEM image of a free standing square pSi microparticle. FIG. 9d shows a confocal fluorescence micrograph of freestanding pSi microparticles on carbon tape (inset shows the photoluminescence spectra of an as-anodized pSi film, excitation λ=488 nm). The fabrication follows a procedure similar to that described above (FIG. 8d), with some important modifications. When a stamp is imprinted all the way into pSi, with the entire stamp surface brought into contact with the substrate, a new and interesting stamping regime occurs. This stamping regime is referred to as "overstamping," to distinguish it from the previous examples presented.

Figure 16:
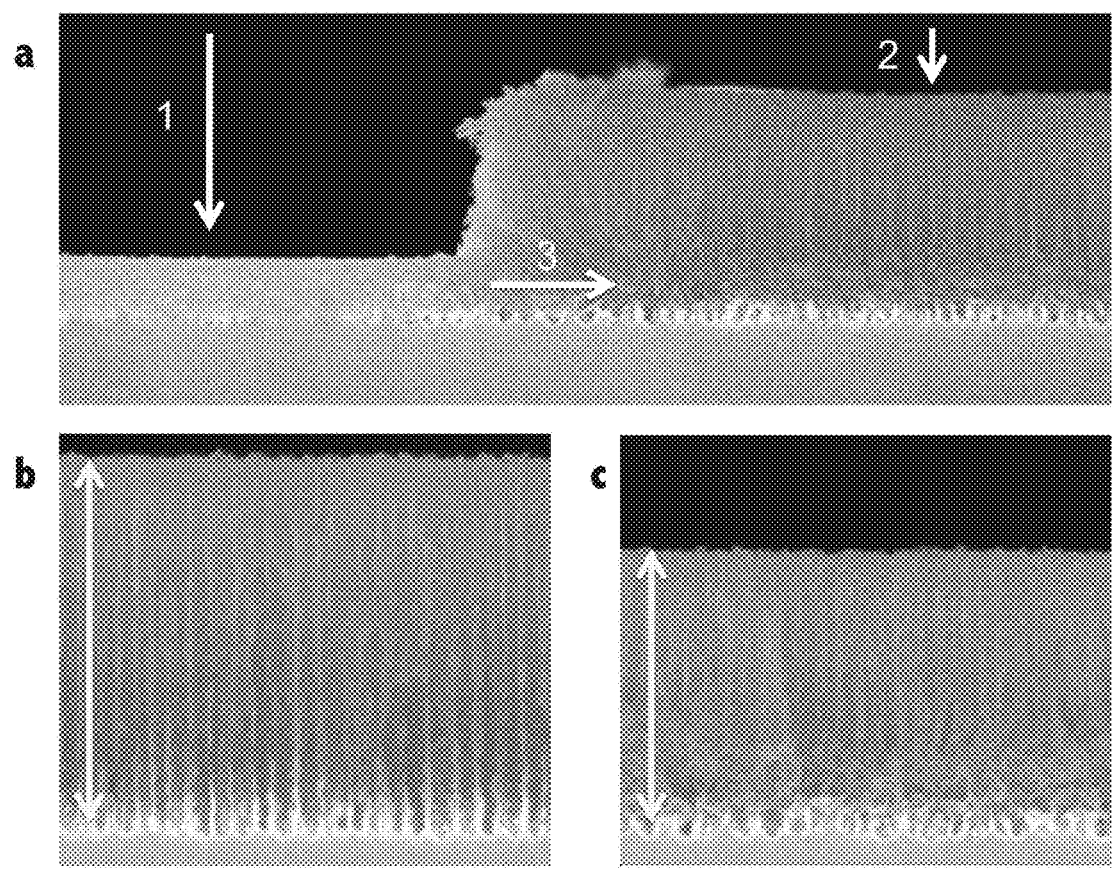
FIG. 16 shows SEM images depicting the "overstamping" regime on pSi.

Overstamping affords the important ability to selectively weaken the base of the porous nanostructure, as shown in FIG. 16. FIG. 16 shows SEM images depicting the "overstamping" regime on pSi. FIG. 16(a) shows imprinting in the overstamping regime requires that the stamp makes contact and applies a pressure in regions 1 & 2. As a result of extreme densification and vertical compression in region 1, some horizontal expansion occurs through region 3, leading to weakening and collapsing of the pore bottoms as they are compressed in region 2. FIG. 16(b) shows the original 1 μm thick 80% porosity film, and FIG. 16(c) shows the overstamped pSi film with a selectively weakened bottom interface.

Figure 17:
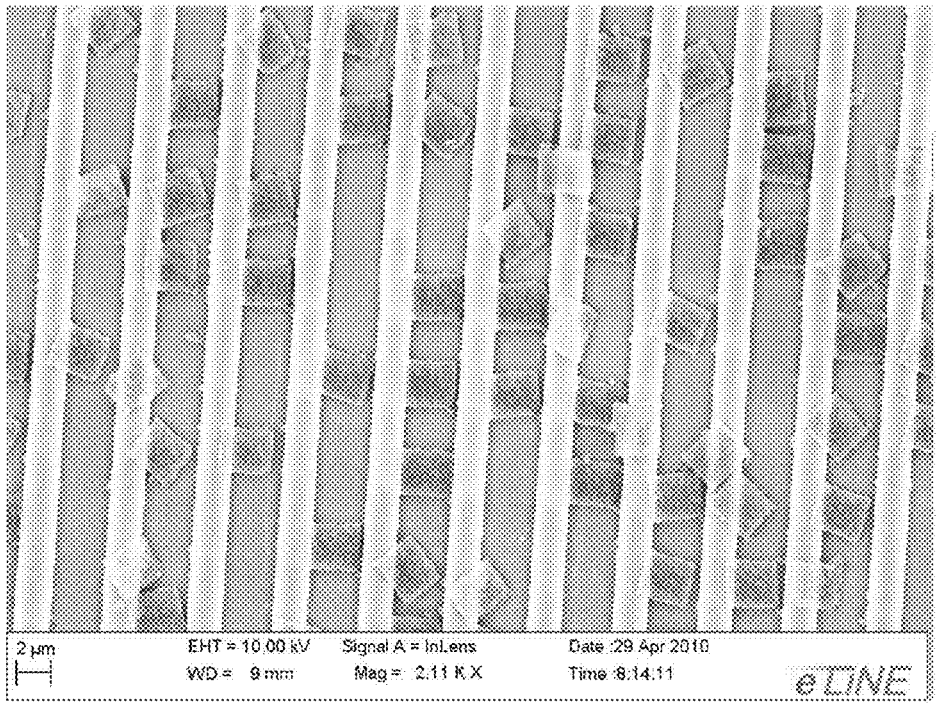
FIG. 17 shows SEM images of freestanding pSi microparticles on the SI stamp used to pattern them.
Figure 17:
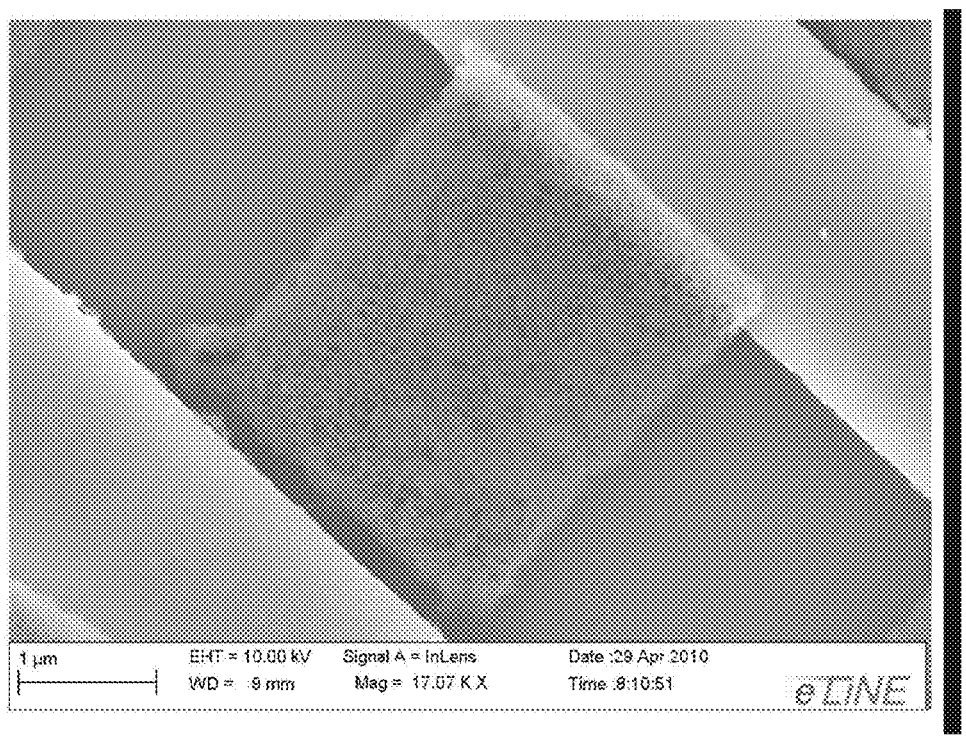

As a result of overstamping, patterned structures can be easily detached from the substrate. This can be done by using the combination of frictional and electrostatic forces that exist between the stamp and the imprinted structure, as shown in FIG. 17. FIG. 17 shows SEM images of freestanding pSi microparticles on the Si stamp used to pattern them. After an initial stamping with a silicon grating (Λ=5 μm, area=9 mm$^2$) on a 1 μm thick 80% porosity pSi film, the stamp was rotated 90 degrees and imprinted again with a force of approximately 3 kN. As a result of overstamping weakening the bottom interface of the pores, some particles were removed by the frictional and electrostatic forces that exist between the pSi and the Si stamp.

Alternatively, patterned structures can be easily detached from the substrate by performing ultrasonication in an aqueous solution, or by simply applying and removing an adhesive such as carbon tape (FIGS. 9c and 9d). These pSi microparticles exhibit excellent size uniformity, and can be readily placed in solution. Other particle geometries could also be realized, on both the micro- and nanoscale, by simply changing the geometry of the applied stamp. Selected particles can exhibit highly desirable traits for use in vivo that include, for example, efficient loading of therapeutics or imaging contrast agents, distinctive photoluminescence or other signatures, and biodegradability.

FIG. 9d further demonstrates that these pSi microparticles maintain their intrinsic photoluminescence properties. In addition to particular interest for in vivo applications, the design of isolated porous particles is also of growing interest for Si-based Li-ion battery anodes, which are particularly attractive for their large specific capacity, low volume, light weight, and potentially low cost.

In summary, DIPS offers an exciting and straightforward approach for realizing a large variety of important device structures based on a wide class of porous nanomaterials. The process enables the fabrication of micro- and nanometer scale porous structures with an unprecedented combination of fast throughput, low cost, and high resolution. As a result, DIPS enhances both the commercialization potential and accessibility of nanostructured materials and devices.

The use of DIPS has been demonstrated on both dielectric and metallic porous materials, in 2D and 3D geometries, and for the fabrication of microparticles. DIPS circumvents the need for lithography, or masking materials and etch chemistries, that form the usual paradigms for the fabrication of structures from porous media. Thus it may open a new class of low-cost technologies involving this important class of materials.

Example 2

Stamping Porous Silicon

Figure 18:
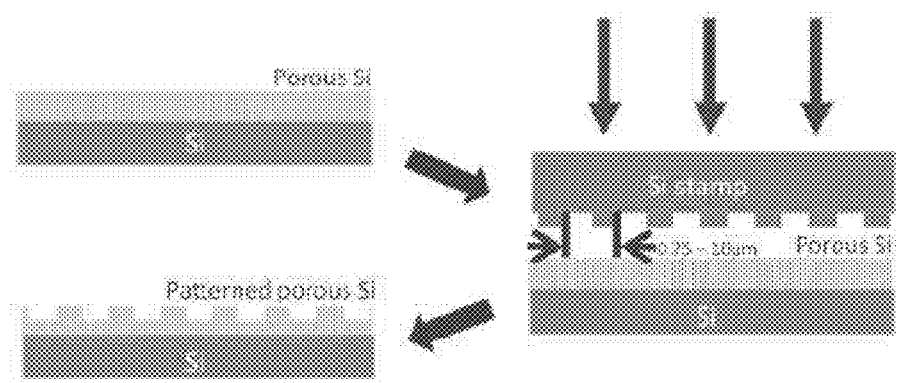
FIG. 18 shows an illustration of the stamping process performed on porous silicon with the use of reusable silicon stamps.

The stamping process applied to porous silicon is shown in FIG. 18. Referring to FIG. 18, first, a porous silicon thin film is prepared from a silicon substrate by electrochemical etching. Next the silicon stamp, prepared by standard lithographic methods, is applied to the porous silicon substrate. Upon removal of the stamp, a patterned porous silicon structure is revealed. No heating, curing, or intermediary coating layer is required. The silicon stamps are reusable and do not wear significantly over time. Furthermore, the patterning process is very rapid as stamping only takes a matter of seconds to be performed.

A variety of stamp patterns and porous silicon substrates were fabricated. Porous silicon single layers were prepared from p-type Si (100) wafers (0.01-0.02 $\Omega$-cm). Samples were anodized in an electrochemical cell in 15% ethanolic hydrofluoric acid. Current densities of 5 mA/cm2 and 80 mA/cm2 were applied to produce films of ≈55% and ≈80% porosity, respectively. Etching times between 2.5-60 seconds were used, depending on the applied current density, to prepare films thicknesses in the 100-300 nm range.

Reusable microscale silicon test patterns and grating stamps were fabricated via photolithography and reactive ion etching. Submicron silicon grating stamps were fabricated via electron beam lithography. Each silicon-grating stamp consisted of a large area (9 mm2) diffraction grating with a height of approximately 500 nm. Grating pitches from 750 nm to 10 µm were produced. Preliminary test patterns were demonstrated by contacting the stamp and substrate using a simple vise grip.

Stamping of large area (9 mm2) patterns was performed using a Tinius Olsen hydraulic tester with a computer-controlled load in the 1 kN-3 kN range. Use of the hydraulic tester insured accurate knowledge of the applied load and uniform application. A calibrated vise-grip or similar tool can also work well in this process.

Imprinting Characterization

I. Test patterns, 10 µm+

A variety of micron-scale test patterns, with feature sizes in the 10-100 µm range were imprinted into porous silicon thin films. These preliminary imprints were examined by optical microscopy and revealed excellent pattern transfer quality. A variety of pattern shapes were tested to demonstrate proof-of-concept imprinting into porous silicon.

Figure 19:
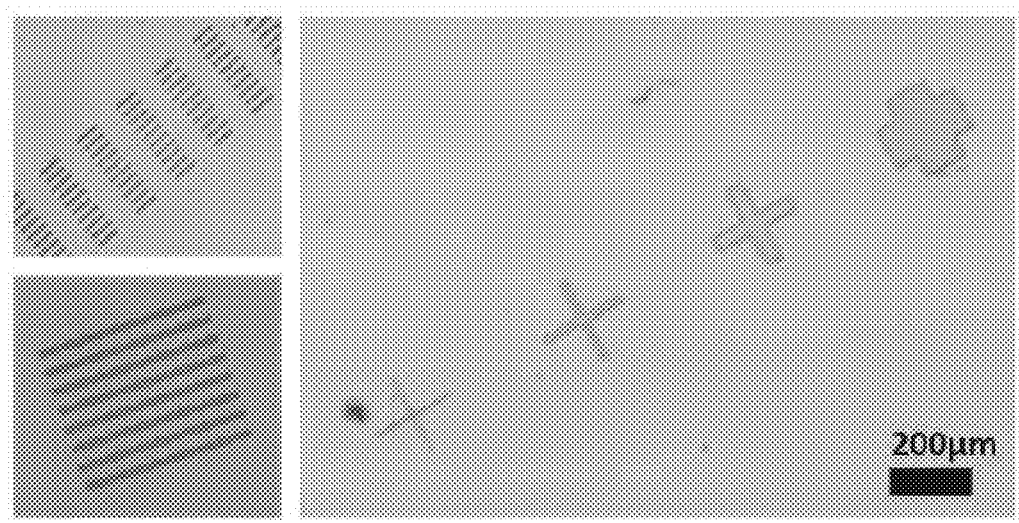
FIG. 19 shows micrographs revealing large size (>10 µm) test patterns imprinted into porous silicon.

FIG. 19 shows the successful imprinting of porous silicon for a variety of test patterns including square and rectangular grating sections as well as crosses. This demonstration reveals qualitatively that large-scale patterns can be readily imprinted into porous silicon using nothing more than a silicon stamp and a vise grip.

II. Grating Patterns, 5-10 µm

Figure 20:
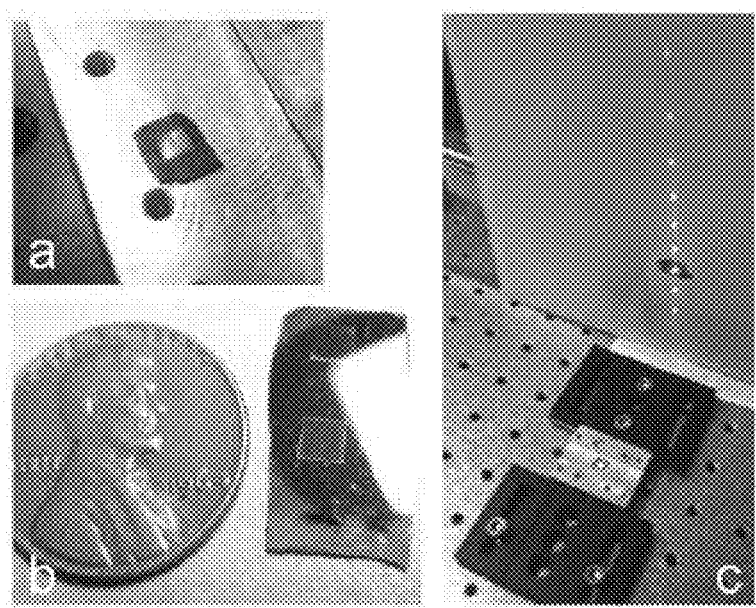
FIG. 20 shows photographs showing (a) white light diffraction [visible in color only], (b) large-area spatial uniformity, and (c) visible diffraction at a fixed wavelength ($\lambda$=647.2 nm).

Large-area (9 mm$^2$) silicon grating stamps with 5-10 µm pitches were stamped into porous silicon thin films to produce porous grating structures. Immediately after stamping, the uniformity of the imprinted pattern could be inspected visually. White light and fixed wavelength diffraction were clearly visible, as shown in FIG. 20. Translating a laser spot around the grating surface revealed consistent diffraction intensity, indicating a highly uniform pattern transfer. The high uniformity of the imprint over a large area suggests that even larger patterns, potentially up to a full wafer scale, could be transferred to porous substrates.

Figure 21:
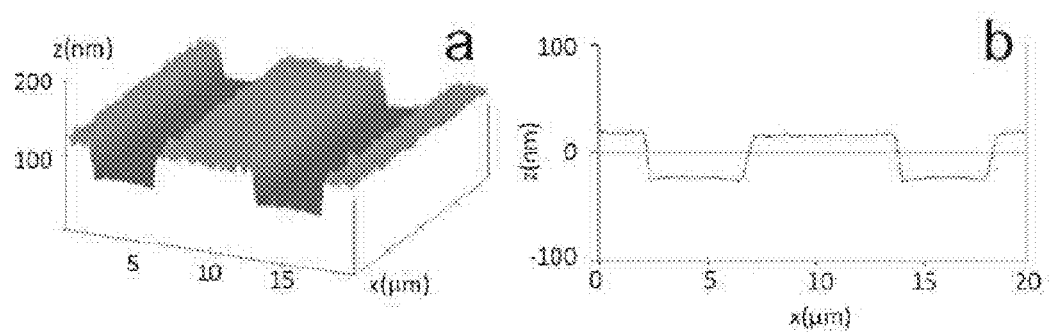
FIG. 21 shows AFM measurements showing (a) three-dimensional pattern profile and (b) cross-section profile for an imprinted 80% porosity pSi film.

AFM measurements confirmed a high degree of imprint uniformity, as grating heights varied no more than a few nanometers over the extent of the imprint. FIG. 21 shows a typical AFM profile for an imprinted porous silicon grating. In this example, the grating height is 40 nm and the pitch is 10 µm. Measurements reveal an air fraction of approximately 0.43, perfectly complementing the 0.57 air fraction determined for the silicon stamp. Importantly, we note that the nature of AFM measurements makes it difficult to obtain good tracking along the steep slope of the sidewalls. Thus, we note that the sidewalls are likely steeper and sharper than they appear in the AFM profile.

The root-mean-square surface ("RMS") roughness of imprinted porous silicon samples was characterized using AFM. Measurements of unstamped regions of porous silicon (i.e., FIG. 21b, 7.5-13 µm) revealed a ≈4 nm (rms) roughness. This roughness is typical of a porous silicon surface. However, the stamped regions of porous silicon exhibited a lower ≈1.5 nm (rms) roughness. Tough not wishing to be bound by a particular theory, this lower roughness value is probably indicative of crushing and flattening of the porous mesostructure. However, as stamping proceeds to densify the porous layer we are concerned with the prospect that the pores may become blocked. This result would then hinder the infiltration of materials into the porous network. In sensing applications for example, this could reduce the amount of analyte that could be incorporated into the pores and adversely affect the performance of the device. However, to this point we have not observed any conclusive evidence confirming or refuting pore occlusion.

III. Submicron Grating Patterns

Figure 22:
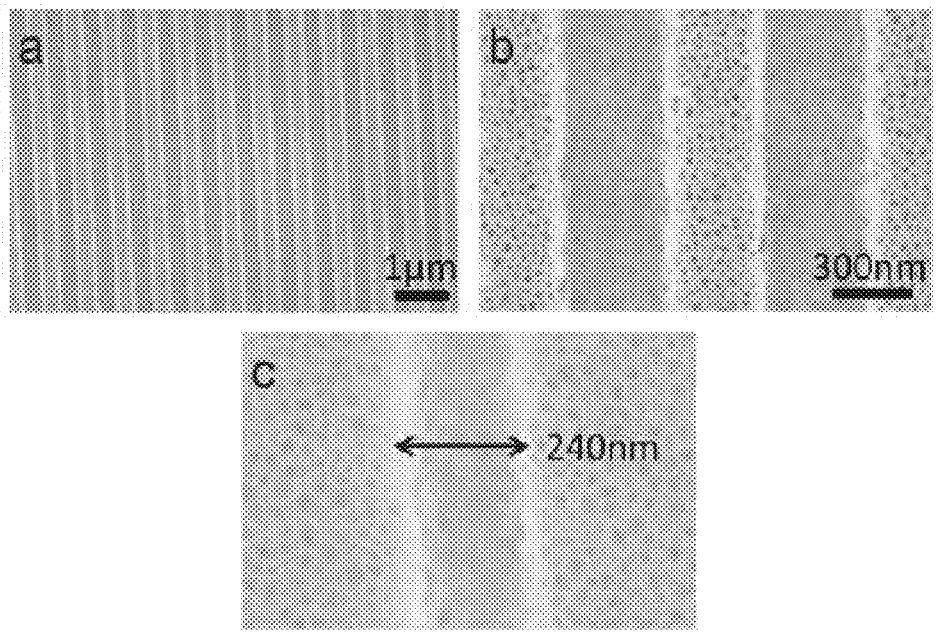
FIG. 22 shows SEM images showing imprinted porous gratings stamped with a 750 nm pitch silicon grating with (a, b)≈55% duty cycle, and (c)≈30% duty cycle.

Silicon grating stamps with a 750 nm pitch were imprinted into porous silicon films in order to investigate the potential for imprinting sub-micron sized features. As shown in FIG. 22, imprinting of the original submicron pattern is successfully demonstrated. The imprinted feature size was varied by simply tuning the duty cycle of the silicon grating stamp. For a ≈30% duty cycle silicon grating stamp, we observe quality patterning for features sizes down to 240 nm. These results suggest that even smaller feature sizes, potentially below 100 nm could be demonstrated.

The SEM images shown in FIG. 22 show the true porous nature of the imprinted gratings. The pores have an average diameter of 20-30 nm. As a natural result of the stamping process, we expect a minimum sidewall roughness on the order of the average pore size. Indeed, this is what we observed. We expect that this roughness could be reduced by simple chemical treatment such as light oxidation followed by an HF dip. Minimizing the sidewall roughness would be important for enabling porous silicon waveguide structures to be employed with minimal optical losses. The SEM images further reveal very sharp sidewalls, confirming visually what could not be distinguished by AFM.

IV. Varying Imprint Depth

In order to precisely control the overall geometry of imprinted structures, it is important to investigate the tuning of vertical features. Thus, we performed experiments with the goal of obtaining fine control over the imprint depth. We report two separate approaches for controlling the imprint depth: (1) varying the applied force and (2) varying the substrate parameters.

Figure 23:
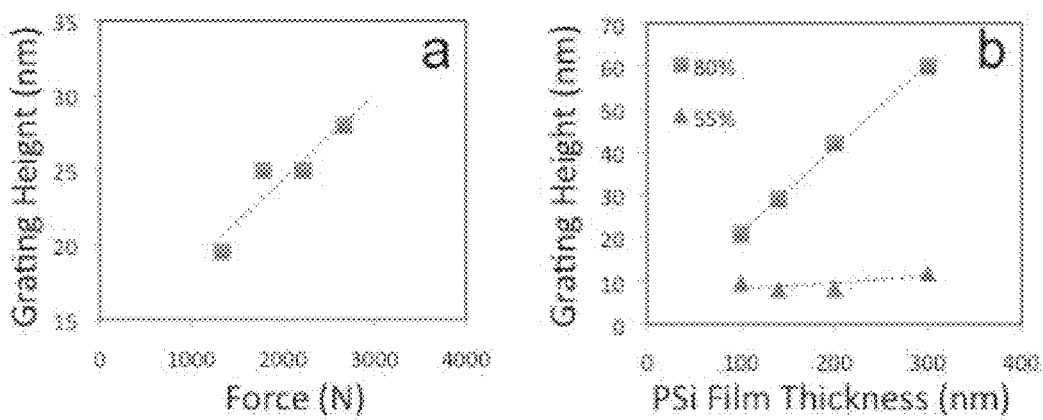
FIG. 23 shows varying the imprint depth of a large area (9 mm²) 10 μm pitch grating by (a) varying the applied force for a 100 nm thick 80% porosity film, and (b) varying the PSi film porosity and thickness for an applied force of 2 kN.

The most immediately apparent method for stamping deeper into a material is to simply apply more force. FIG. 23a shows the results for varying the applied force on a 10 µm pitch silicon grating stamped into a 100 nm thick 80% porosity porous silicon film. The trend shows that it is indeed possible to fine-tune the imprint depth by adjusting the applied force as we readily obtain imprint depths between 20-30 nm by varying the applied force between 1-3 kN. For this particular substrate and stamp size, going to much larger grating heights, for example beyond 60 nm, would require a force of at least 10 kN to be applied. For waveguides or any optical devices with a small footprint, obtaining this deep of an imprint should not be an issue, as it will require significantly less force to obtain the same applied pressure.

However, if we need to obtain a deep imprint for a specific large footprint application, such as a grating, then we should consider an alternative approach that does not require upwards of 10 kN. FIG. 23b presents an alternative method for varying the porous grating imprint depth, by means of varying the substrate parameters. The data reveals a range of imprint depths obtained for a fixed applied force of 2 kN. Two different imprinting regimes are apparent depending on the porous silicon film porosity. In the first regime, corresponding to 80% porosity porous silicon thin films, we observe increasing imprint depth with increasing film thickness. This trend occurs because the hardness of high-porosity p+ PSi decreases with increasing film thickness. Changes in hardness arise due to the influence of the underlying silicon substrate. In general, when imprinting to a depth h>d/10 where d is the film thickness, the influence of the underlying substrate cannot be ignored17. In this regime, an effective hardness must be computed. Thus, as d approaches zero, the film hardness increases to approach that of bulk silicon. This regime however does not apply to 55% porosity porous silicon, under these testing conditions, because the imprint depth h is not greater than d/10. Thus, the applied stamp encounters a consistent material hardness regardless of the film thickness.

Example 3

In this example, the sensitivity of a traditional diffraction-based biosensor ("DBB") was compared with that of a pSi-DBB, composed of a pSi grating. In a traditional DBB, an increase $\delta h$ of the grating height occurs when an analyte is adsorbed onto the grating surface. This gives rise to a change $\Delta\eta$ of the grating diffraction efficiency. When the grating height is smaller than the wavelength $\lambda$ and $\delta h$ much smaller than the original grating height, $\Delta\eta$ scales linearly with $\delta h$, which is proportional to the number of analyte molecules adsorbed on the grating surface; the slope of the curve is the device sensitivity.

A pSi-DBB, in contrast, is composed of a thicker grating realized on a silicon substrate. Once functionalized, the pSi surface is also able to immobilize a specific analyte, but with an infiltration of the grating. Its physical thickness remains almost unchanged, as suggested by the experimental results reported in FIG. 24. Nonetheless, analyte infiltration leads to a change in the effective refractive index of the pSi, and thus to a change in the optical thickness of the grating. A change $\Delta\eta$ of the diffraction efficiency again arises, which here is linear in the analyte fraction $f_{analyte}$ in the pSi. In order to compare the two systems, assume equal amounts of analyte present in the different sensors. For two sensors with the same grating area, it can be shown that $f_{analyte}=\delta h/D$, where D is the pSi grating height.

Figure 24:
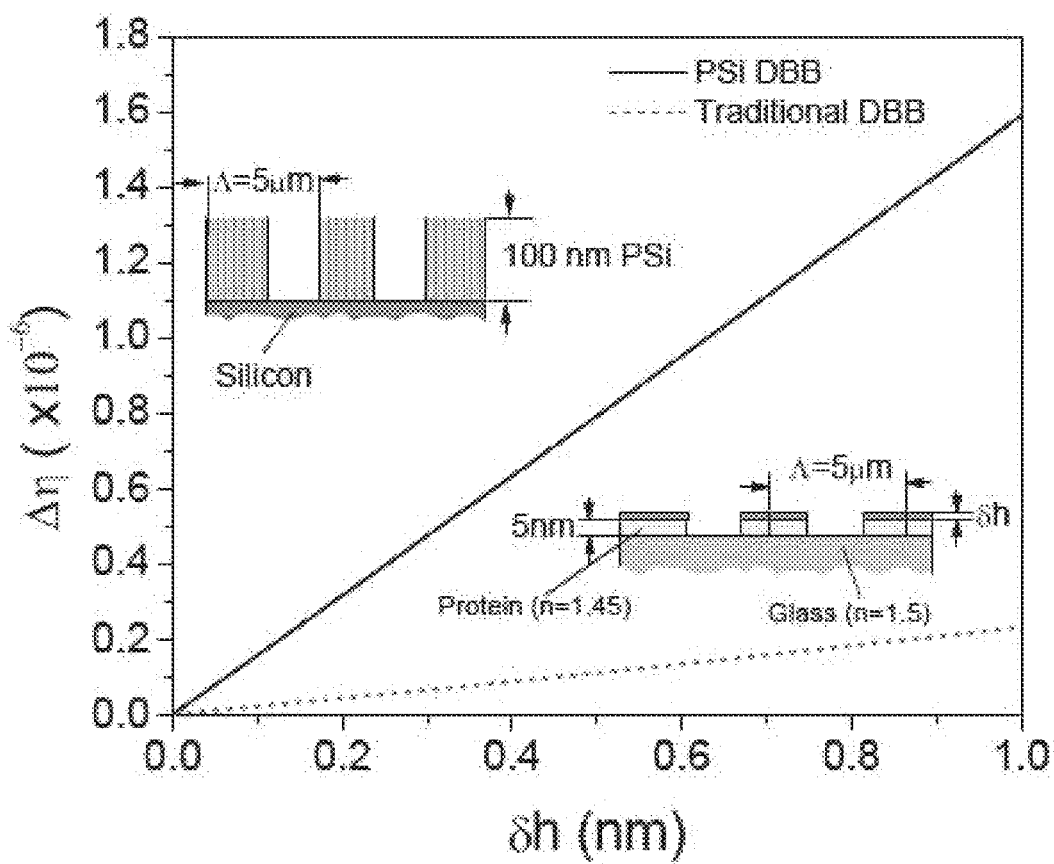
FIG. 24 shows calculated diffraction efficiency variation Δη for a traditional and a PSi diffraction based biosensor as a function of the change of the grating thickness δh. The incident beam wavelength is =1550 nm, and the angle of incidence is =20 degrees.

In FIG. 24 the calculated diffraction efficiency variation for a traditional DBB with a protein grating (n=1.45) of height h=5 nm and period=$\Lambda$5 µm on a glass substrate (n=1.5), and for a pSi-DBB with low-porosity (p=0.61) grating of thickness D=100 nm on a silicon substrate, both as a function of $\delta h$ in the traditional DBB, where $f_{analyte}=\delta h/D$ in the pSi-DBB, was plotted.

The calculations show an increase of the sensitivity of about 8 times, without any optimization of the pSi structure. In addition to the sensitivity enhancement, which is essentially due to the use of a higher original grating, there are other important advantages in the use of pSi for the realization of DBBs: (1) The surface available for protein binding in the pSi-DBB sensor is much larger than in the traditional DBB sensor, and so the promptness of the detector may be enhanced as well as its sensitivity; (2) It has been demonstrated that DBB efficiency can be improved exploiting effects of field localization near the grating. This could be easily implemented in a pSi device by realizing the grating on a pSi waveguide.

What is claimed is:

1. A method of imprinting a porous nanomaterial, the method comprising:
   providing a first stamp, the first stamp having a plurality of first protrusions and a plurality of first recesses defined on a surface thereof, wherein the surface of the first stamp is made of silicon;
   applying the first stamp to a porous nanomaterial having a porosity of about 20% to about 95% and comprising pores less than 1 µm; and
   forming a plurality of second protrusions and a plurality of second recesses defined therebetween in the porous nanomaterial, wherein the plurality of second protrusions and the plurality of second recesses are complementary to the plurality of first recesses and the plurality of first protrusions, respectively, wherein each of the plurality of second protrusions has a width of less than about 10 µm, and wherein the porous nanomaterial comprises at least one of porous silicon, nanoporous gold, porous alumina, porous titanium dioxide, and mixtures thereof.

2. The method of claim 1, wherein each of the plurality of second recesses has a depth of about 1 nm to about 100 µm.

3. The method of claim 1, wherein each of the plurality of second recesses has a depth of less than about 800 nm.

4. The method of claim 1, wherein the method is conducted at about room temperature.

5. The method of claim 1, further comprising the steps of:
rotating the first stamp;
applying the first stamp to the porous nanomaterial; and
removing the first stamp from contact with the porous nanomaterial.

6. The method of claim 1, further comprising the steps of:
applying a second stamp to the porous nanomaterial, the second stamp having a plurality of third protrusions and a plurality of third recesses defined on a surface thereof, wherein the surface of the second stamp is made of silicon, and wherein the second stamp comprises a different pattern than the first stamp;
forming a plurality of fourth protrusions and a plurality of fourth recesses defined therebetween in the porous nanomaterial, wherein the plurality of fourth protrusions and the plurality of fourth recesses are complementary to the plurality of third recesses and the plurality of third protrusions, respectively; and
removing the second stamp from contact with the porous nanomaterial.

7. The method of claim 1, wherein the first stamp compresses regions of the porous nanomaterial by less than about 100 µm.

8. The method of claim 1, wherein the first stamp compresses regions of the porous nanomaterial by less than about 1 µm.

9. The method of claim 1, wherein the first stamp compresses regions of the porous nanomaterial by about 100 nm to about 10 µm.

10. A method of imprinting a porous nanomaterial, the method comprising:
providing a first stamp, the first stamp having a plurality of first protrusions and a plurality of first recesses defined on a surface thereof, wherein the surface of the first stamp is made of silicon;
applying the first stamp to a porous nanomaterial, wherein the nanomaterial comprises pores less than 1 µm; and
compressing regions of the porous nanomaterial by at least about 10% to form a plurality of second protrusions and a plurality of second recesses defined therebetween, wherein the plurality of second protrusions and the plurality of second recesses are complementary to the plurality of first recesses and the plurality of first protrusions, respectively, wherein each of the plurality of second protrusions has a width of less than about 10 µm, and wherein the porous nanomaterial comprises at least one of porous silicon, nanoporous gold, porous alumina, porous titanium dioxide, and mixtures thereof.

11. The method of claim 10, wherein the porous nanomaterial comprises porous silicon.

12. The method of claim 11, wherein the porous silicon has a porosity of about 30% to about 90%.

13. The method of claim 10, wherein the first stamp is a reusable stamp.

14. The method of claim 10, wherein the first stamp is a pre-mastered stamp.

15. The method of claim 10, wherein the porous nanomaterial is mounted on a substrate.

16. The method of claim 15, wherein the substrate comprises at least one of silicon, glass, metal, quartz, plastic, and combinations thereof.

17. The method of claim 10, wherein the first stamp exerts at least about 50 N/mm$^2$ to about 500 N/mm$^2$ of pressure on the porous nanomaterial.

18. The method of claim 10, wherein the first stamp contacts the porous nanomaterial for about 1 second to about 5 seconds.

19. The method of claim 10, further comprising the steps of:
rotating the first stamp;
applying the first stamp to the porous nanomaterial; and
removing the first stamp from contact with the porous nanomaterial.

20. The method of claim 10, further comprising the steps of:
applying a second stamp to the porous nanomaterial, the second stamp having a plurality of third protrusions and a plurality of third recesses defined on a surface thereof, wherein the surface of the second stamp is made of silicon, and;
removing the second stamp from contact with the porous nanomaterial.

21. The method of claim 10, wherein the first stamp compresses regions of the porous nanomaterial by less than about 100 µm.

22. The method of claim 10, wherein the first stamp compresses regions of the porous nanomaterial by less than about 1 µm.

23. The method of claim 10, wherein the first stamp compresses regions of the porous nanomaterial by about 100 nm to about 10 µm.

24. A method of imprinting a porous nanomaterial, the method comprising:
providing a first stamp, the first stamp having a plurality of first protrusions and a plurality of first recesses defined on a surface thereof, wherein the surface of the first stamp is made of silicon;
applying the first stamp to a porous nanomaterial having a porosity of greater than about 20%, wherein the porous nanomaterial comprises pores less than 1 µm; and
forming a plurality of second protrusions in the porous nanomaterial, wherein each of the plurality of second protrusions has a height of about 1 nm to about 100 µm and a width of less than about 10 µm, wherein the plurality of second protrusions and the plurality of second recesses are complementary to the plurality of first recesses and the plurality of first protrusions, respectively, and wherein the porous nanomaterial comprises at least one of porous silicon, nanoporous gold, porous alumina, porous titanium dioxide, and mixtures thereof.

25. The method of claim 1, wherein the plurality of second protrusions comprise an ordered array.

26. The method of claim 25, wherein the plurality of second protrusions in the ordered array comprise a plurality of uniform protrusions alternating with uniform recesses therebetween.

27. The method of claim 1, wherein the porous nanomaterial is supported on a substrate and wherein imprinting the porous nanomaterial further comprises overstamping the porous nanomaterial such that the first stamp makes contact with the substrate.

28. The method of claim 1, wherein the porous nanomaterial comprises pores less than 100 nm.

29. The method of claim 24, further comprising a step of etching the porous nanomaterial following forming protrusions in the porous nanomaterial.

* * * * *